(12) United States Patent
Benfey et al.

(10) Patent No.: US 8,312,673 B2
(45) Date of Patent: Nov. 20, 2012

(54) PLANT GROWTH AND IMAGING DEVICES AND RELATED METHODS AND COMPUTER PROGRAM PRODUCTS

(75) Inventors: Philip N. Benfey, Chapel Hill, NC (US); Richard W Twigg, III, Durham, NC (US); Robert L. Clark, Jr., Chapel Hill, NC (US); Scott Joseph Kennedy, Durham, NC (US); Gregory Kealoha Fricke, Durham, NC (US)

(73) Assignee: GrassRoots Biotechnology, Inc., Chapel Hill, NC (US)

(*) Notice: Subject to any disclaimer, the term of this patent is extended or adjusted under 35 U.S.C. 154(b) by 0 days.

(21) Appl. No.: 13/081,013

(22) Filed: Apr. 6, 2011

(65) Prior Publication Data

US 2011/0197509 A1 Aug. 18, 2011

Related U.S. Application Data

(62) Division of application No. 11/942,185, filed on Nov. 19, 2007, now Pat. No. 7,937,891.

(60) Provisional application No. 60/860,150, filed on Nov. 20, 2006.

(51) Int. Cl.
*A01G 31/00* (2006.01)
(52) U.S. Cl. .......................................................... 47/60
(58) Field of Classification Search .................. 47/59 R, 47/59 S, 60, 61, 62 R, 64
See application file for complete search history.

(56) References Cited

U.S. PATENT DOCUMENTS

| | | | |
|---|---|---|---|
| 2,026,322 A | 12/1932 | Raines | |
| 3,125,830 A | 3/1964 | Knutsson | |
| 4,000,850 A | 1/1977 | Diggs | |
| 6,541,203 B2 | 4/2003 | Mitchison | |
| 6,608,717 B1 | 8/2003 | Medford et al. | |
| 7,253,338 B2 | 8/2007 | Verbruggen | |
| 2002/0088173 A1 | 7/2002 | Hessel | |
| 2003/0221366 A1 | 12/2003 | Weiner et al. | |
| 2004/0115683 A1 | 6/2004 | Medford et al. | |
| 2005/0105172 A1 | 5/2005 | Hasegawa | |
| 2005/0192760 A1 | 9/2005 | Dunlap | |
| 2006/0050946 A1 | 3/2006 | Mitchison et al. | |
| 2007/0289211 A1 | 12/2007 | Lejeune et al. | |

OTHER PUBLICATIONS

Andrews et al. "To 5D and Beyond: Quantitative Fluorescence Microscopy in the Postgenomic Era" *Traffic* 3:29-36 (2002).
Beemster et al. "Analysis of Cell Division and Elongation Underlying the Developmental Acceleration of Root Growth in *Aarabidopsis thaliana*" *Plant Physiol.* 116:1515-1526 (1997).
Benfey et al. "Development and Ecology in the Time of Systems Biology" *Developmental Cell* 7:329-330 (2004).
Benfey et al. "Developmental Networks" *Plant Physiology* 138:548-549 (2005).
Birnbaum et al. "A Gene Expression Map of the *Arabidopsis* Root" *Science* 302:1956-1960 (2003).
Birnbaum et al. "Network building: transcriptional circuits in the root" *Current Opinion in Plant biology* 7:582-588 (2004).

(Continued)

*Primary Examiner* — Monica Williams
(74) *Attorney, Agent, or Firm* — Myers Bigel Sibley & Sajovec

(57) ABSTRACT

A plant growth array device includes an aerial growth chamber configured to receive aerial shoot portions of a plurality of plants and a root growth chamber configured to receive root portions of the plurality of plants. A dividing member is between the aerial growth chamber and the root chamber and has a plurality of apertures for receiving the plurality of plants therein. The plurality of apertures are configured so that the root portions grow substantially in a common orientation.

16 Claims, 18 Drawing Sheets

OTHER PUBLICATIONS

Birnbaum et al. "Cell type-specific expression profiling in plants via cell sorting of protoplasts from fluorescent reporter lines" *Nature Methods* 2(8):615-619 (2005).

Brady et al. "A High-Resolution Root Spatiotemporal Map Reveals Dominant Expression Patterns" *Science* 318:801-806 (2007).

Brown et al. "Exploring the new world of the genome with DNA microarrays" *Nat Genet.* 21(1 Suppl):33-37 (1999) <www,//genetics.nature.com>.

Chalfie et al. "Green Fluorescent Protein as a Marker for Gene Expression" *Science* 263:802-805) (1994).

Cui et al. "An Evolutionarily Conserved Mechanism Delimiting SHR Movement Defines a Single Layer of Endodermis in Plants" *Science* 316:421-425 (2007).

Cutler et al. "Random GFP:cDNA fusions enable visualization of subcellular structure in cells of *Arabidopsis* at a high frequency" *PNAS* 97(7):3718-3723 (2000).

de Reuille et al. Computer simulations reveal properties of the cell-cell signaling network at the shoot apex in *Arabidopsis* 103(5):1627-1632 (2006).

Dixit et al. "Techniques for Molecular Analysis—Using intrinsically fluorescent proteins for plant cell imaging" *The Plant Journal* 45:599-615 (2006).

Dmochowski et al. "Quantitative imaging of cis-regulatory reporters in living embryos" PNAS 99(20):12895-12900 (2002).

Downes et al. "Post-translational regulation in plants employing a diverse set of polypeptide tags" *Biochemical Society Transations* 33(part 2):393-399 92005).

Echeverri et al. "High-throughput RNAi screening in cultured cells: a user's guide" *Nature Reviews/Genetics* 7:373-384 (2006).

Eggert et al. "Parallel Chemical Genetic and Genome-Wide RNAi Screens Identify Cytokinesis Inhibitors and Targets" *PloS Biology* 2(12):2135-2143 (2004).

Eggert et al. "Small molecule screening by imaging" *Current Opinion in Chemical Biology* 10:232-237 (2006).

Friedman et al. "Precise Temporal Modulation in the Response of the SOS DNA Repair Network in Individual Bacteria" *PloS Biology* 3(7):1261-1268 (2005).

Giepmans et al. "The Fluorescent Toolbox for Assessing Protein Location and Function" *Science* 312:217-224 (2006).

Grabov et al. "Morphometric analysis of root shape" *New Phytologist* 165:641-652 (2005).

Harbison et al. "Transcriptional regulatory code of a eukaryotic genome" *Nature* 431:99-104 (2004).

Helariutta et al. "The SHORT-ROOT Gene Controls Radial Patterning of the *Arabidopsis* Root through Radial Signaling" *Cell* 101:555-567 (2000).

Ideker et al. "Integrated Genomic and Proteomic Analyses of a Systematically Perturbed Metabolic Network" *Science* 292:929-934 (2001).

Irish et al. "Beyond Arabidopsis. Translational Biology Meets Evolutionary Developmental Biology" *Plant Physiology* 135:611-614 (2004).

Jönsson et al. "Modeling the organization of the WUSCHEL expression domain in the shoot apical meristem" *Bioinformatics* 21(Suppl 1):i232-i240 (2005).

Kakoki et al. "Altering the Expression in Mice of Genes by Modifying their 3' Regions" *Developmental Cell* 6:597-606 (2004).

Kalir et al. "Ordering Genes in a Glagella Pathway by Analysis of Expression Kinetics from Living Bacteria" *Science* 292:2080-2083 (2001).

Kiger et al. "A functional genomic analysis of cell morphology using RNA interference" *Journal of Biology* 2(4):27.1-27.15 (2003).

Lee et al. "High-Throughput RNA Isolation Technologies. New Tools for High-Resolution Gene Expression Profiling in Plant Systems" *Plant Physiology* 138:585-590 (2005).

Lee et al. "Transcriptional and posttranscriptional regulation of transcription factor expression in *Arabidopsis* " *PNAS* 103(15):6055-6060 (2006).

Levesque et al. "Trait-to-Gene: A Computational Method for Predicting the Function of Uncharacterized Genes" *Current Biology* 13:129-133 (2003).

Levesque et al. "Systems biology" *Current Biology* 14(5):R179-R180 (2004).

Levesque et al. Whole-Genome Analysis of the SHORT-ROOT Developmental Pathway in *Arabidopsis* 4(5):0739-0752 (2006).

Lucchetta et al. "Dynamics of *Drosophila* embryonic patterning network perturbed in space and time using microfluidics" *Nature* 434:1134-1138 (2005).

Mace et al. "Quantification of transcription factor expression from Arabidopsis images" *Vioinformatics* 22(14):e323-e331 (2006).

Manak et al. "Remote Sensing of Gene Expression in Planta: Transgenic Plants as Monitors of Exogenous Stress Perception in Extraterrestrial Environments" *Life Support & Biosphere Science* 8:83-91 (2002.

McDonald et al. "Fabrication of microfluidic systems in poly(dimethylsiloxane)" *Electrophoresis* 21:27-40 (2000).

Menéndez-Benito et al. "Monitoring of Ubiquitin-Dependent Proteolysis with Green Fluorescent Protein Substrates" *Methods in Enzymology* 399:490-511 (2005).

Mirabella et al. "Use of the Fluorescent Timer DsRED-E5 as Reporter to Monitor Dynamics of Gene Activity in Plants" *Plant Physiology* 135:1879-1887 (2004).

Mitchison, Timothy J. "Small-Molecule Screening and Profiling by Using Automated Microscopy" *ChemBioChem* 6:33-39 (2005).

Nawy et al. "Transcriptional Profile of the Arabidopsis Root Quiescent Center" *The Plant Cell* 17:1908-1925 (2005).

Perlman et al. "Multidimensional Drug Profiling by Automated Microscopy" *Science* 306(5699):1194-1198.

"Quantitative trait locus" 1-2 <http://en.wikipedia.org/wiki/Quantitative_trail_loci> (believed prior to Nov. 20, 2006).

Rosenfeld et al. "Gene Regulation at the Single-Cell Level" *Science* 307:1962-1965 (2005).

Rual et al. "Towards a proteome-scale map of the human protein-protein interaction network" *Nature* 437:1173-1178 (2005).

Schmid et al. "A gene expression map of *Arabisopsis thaliana* development" *Nature Genetics* 37(5):501-506 (2005).

Shaner et al. "Improved monomeric red, orange and yellow fluorescent proteins derived from *Discosoma* sp. Red fluorescent protein" *nature Biotechnology* 22(12):1567-1572 (2004).

Shaner et al. "A guide to choosing fluorescent proteins" *Nature Methods* 2(12):905-909 (2005).

Somerville et al. "Plant Biology in 2010" *Science* 290:2077-2078 (2000).

Swarup et al. "Root gravitropism requires lateral root cap and epidermal cells for transport and response to a mobile auxin signal" *Nature Cell Biology* 7(11):1057-1065 (2005).

Wu et al. "Counting Cytokinesis Proteins Globally and Locally in Fission Yeast" *Science* 310:310-314 (2005).

Yamada et al. "Empirical Analysis of Transcriptional Activity in the Arabidopsis Genome" *Science* 302:842-846 (2003).

Yarro et al. "Screening for Cell Migration Inhibitors via Automated Microscopy Reveals a Rho-Kinase Inhibitor" *Chemistry & Biology* 12:385-395 (2005).

International Search Report and the Written Opinion for PCT/US2007/024123.

a ORIGINAL IMAGE b LABELED IMAGE

S
END
C
Epi

PLANT GROWTH AND IMAGING DEVICES AND RELATED METHODS AND COMPUTER PROGRAM PRODUCTS

RELATED APPLICATIONS

This application is a divisional application of and claims priority to U.S. patent application Ser. No. 11/942,185, filed Nov. 19, 2007, now U.S. Pat. No. 7,937,891 which in turn claims priority to U.S. Patent Application Ser. No. 60/860,150, filed Nov. 20, 2006, the disclosures of each of which are incorporated by reference in their entireties.

STATEMENT OF GOVERNMENT SUPPORT

This invention was made with Government support under grant numbers AT2010 0435881 and AT2010 0618304 from the National Science Foundation. The Government has certain rights to this invention.

FIELD OF THE INVENTION

The present invention relates to devices for growing and/or imaging plants. In particular embodiments, the invention relates to microscopy for imaging plant root or shoot portions.

BACKGROUND OF THE INVENTION

The development of a multicellular organism is achieved by coordinated regulation of cell division, expansion and differentiation. Within each cell, the genetic regulation, which controls development and physiological homeostasis, can be described as a network of permissive and inhibitory interactions between molecules that communicate a biological process or cellular state. Such networks can be characterized by the collection of molecular nodes that are present in the system and by the connections of these nodes by functional interaction. However, the nature of cellular genetic networks is highly dynamic. These networks will change as the cell state progresses through its ontogenic trajectory and as it responds to a changing cellular environment. Multicellular development can thus be described as a system of interconnected cell networks changing over time.

Temporal and spatial gene expression regulation is a primary mechanism that dictates the functional networks underlying physiology and development. Determining the abundance of the RNA and protein expression products of genes in each cell, and through the course of development, may provide quantitative data to model the nodes in these networks. Assigning functional connections between nodes may necessitate additional types of mechanistic data describing the physical interactions between individual RNA, DNA, and protein molecular nodes [Ideker et al. 2001, Harbison et al. 2004, Rual et al. 2005]. Functions ascribed by gene expression regulation at the transcriptional and post-transcriptional level can be achieved by multiple modes of molecular interactions. An understanding of the functional connections regulating expression at a genomic level may include information about transcription factors and the genes they regulate, coordinated regulation of epigenetic states, alternative splicing, and the extent of post-transcriptional regulation.

The root is a plant's primary interface with the environment for nutrition and hydration. However, the root is typically hidden from view and has remained an underexploited target of research in fields such as crop improvement. The sessile nature of plants requires that a plant adapt its developmental program to accommodate its environment. Extensive expression analyses of whole plants or organs exposed to abiotic stimuli have been performed, providing an indication of the genes mediating a response [Seki et al. 2002, Schmid et al. 2005, data publicly available at http://www.arabidopsis.org/info/expression/ATGenExpress.jsp]. However it is understood that the collection of tissue types in each sample may dilute the expression signal from any one tissue [Birnbaum et al. 2003]. It is not generally well understood how each cell type in the root coordinates the genetic response to a change in its environment.

Green Fluorescent Protein (GFP) and other fluorescent proteins may be used for an extensive list of in vivo experimental techniques (see reviews by Giepmans et al. 2006, Dixit and Gilroy 2006). Microscopy images of tissues expressing fluorescent reporters may be a rich form of experimental evidence. Such images may yield quantifiable data for both morphology and for the abundance of fluorescence emission [reviewed by Andrews et al. 2002]. Fusing proteins to GFP has been used to approximate the stoichiometry of interacting proteins in the contractile ring of the single-celled fission yeast [Wu and Pollard 2005]. Work in the single-celled bacteria *Escheria coli* has demonstrated that capturing the fluorescent activity of promoter reporters by image analysis can predict the order of a genetic pathway and can provide kinetic parameters to quantitatively model a transcriptional network [Kalir et al. 2001, Friedman et al. 2005, Rosenfeld et al. 2005]. Quantitative imaging of promoter reporters in multicellular organisms aims to extract data for each cell or tissue type; however, this work may be complicated by the attenuation and scatter of fluorescence by imaging depth.

Quantitative fluorescence imaging in the root has been performed, such as automating the measurement of relative fluorescence values between tissues layers [Lee et al. 2005, Mace et al (2006)]. However, plants that are grown for root imaging, such as *Arabidopsis*, are typically transferred from the growth media (e.g., on a Petri dish) to a glass microscopy slide. This process often inflicts damage to the root, and precludes the possibility of unperturbed development upon return to its growth media.

SUMMARY OF EMBODIMENTS OF THE INVENTION

According to embodiments of the invention, a plant growth array device includes an aerial growth chamber configured to receive aerial shoot portions of a plurality of plants. A root growth chamber is configured to receive root portions of the plurality of plants. A dividing member is between the aerial growth chamber and the root chamber and has a plurality of apertures for receiving the plurality of plants therein. The plurality of apertures are configured so that the root portions grow substantially in a common orientation.

According to further embodiments of the invention, methods of imaging a root and/or aerial portion of a plurality of plants include growing a plurality of plants in a plant growth array device. The device includes an aerial growth chamber configured to contain aerial shoot portions of the plurality of plants. A root growth chamber is configured to contain root portions of the plurality of plants. A dividing member is between the aerial growth chamber and the root chamber and has a plurality of apertures for receiving the plurality of plants therein. The root portions and/or aerial shoot portions of the plurality of plants in the plant growth array device are imaged.

According to further embodiments of the present invention, computer program product for imaging root and/or aerial portions of a plurality of plants includes a computer readable medium having computer readable program code embodied therein. The computer readable program code includes computer readable program code configured to identify a region of a first image that includes a root and/or aerial portion of at least one of a plurality of plants, and to image the identified region to provide a second image.

According to further embodiments of the present invention, a plant growth array device includes an aerial growth chamber configured to receive aerial shoot portions of a plurality of plants and a root growth chamber configured to receive root portions of the plurality of plants. A dividing member is between the aerial growth chamber and the root chamber and has a plurality of apertures for receiving the plurality of plants therein. A translucent and/or transparent imaging panel is configured to provide an imaging interface between an imaging device and at least one of the aerial growth chamber and the root growth chamber.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 13B is a series of confocal fluorescence images of an *Arabidopsis* root illustrating pSCR:GFP activation over 12 hours in the mutant cortex/endodermis layer, representing a subset of the images from which FIG. 13A is derived, according to embodiments of the present invention;

DETAILED DESCRIPTION OF EMBODIMENTS OF THE INVENTION

Figure 1:
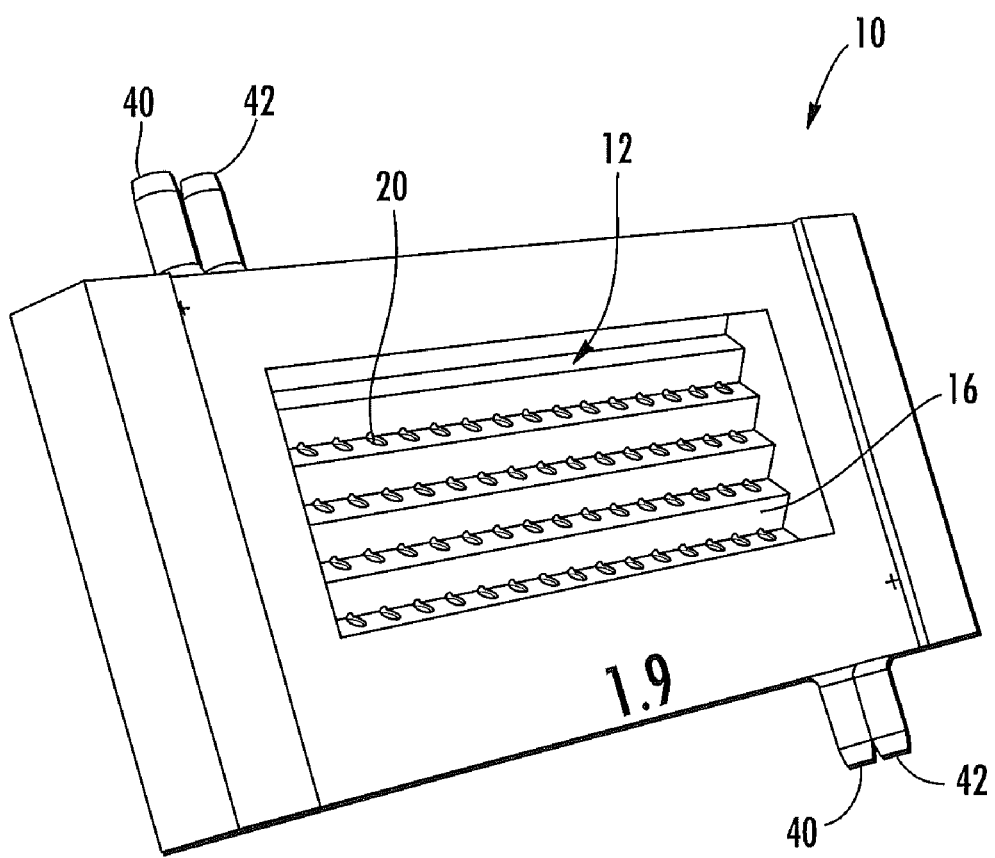
FIG. 1 is a top perspective view of a plant growth array device according to embodiments of the present invention.
Figure 2:
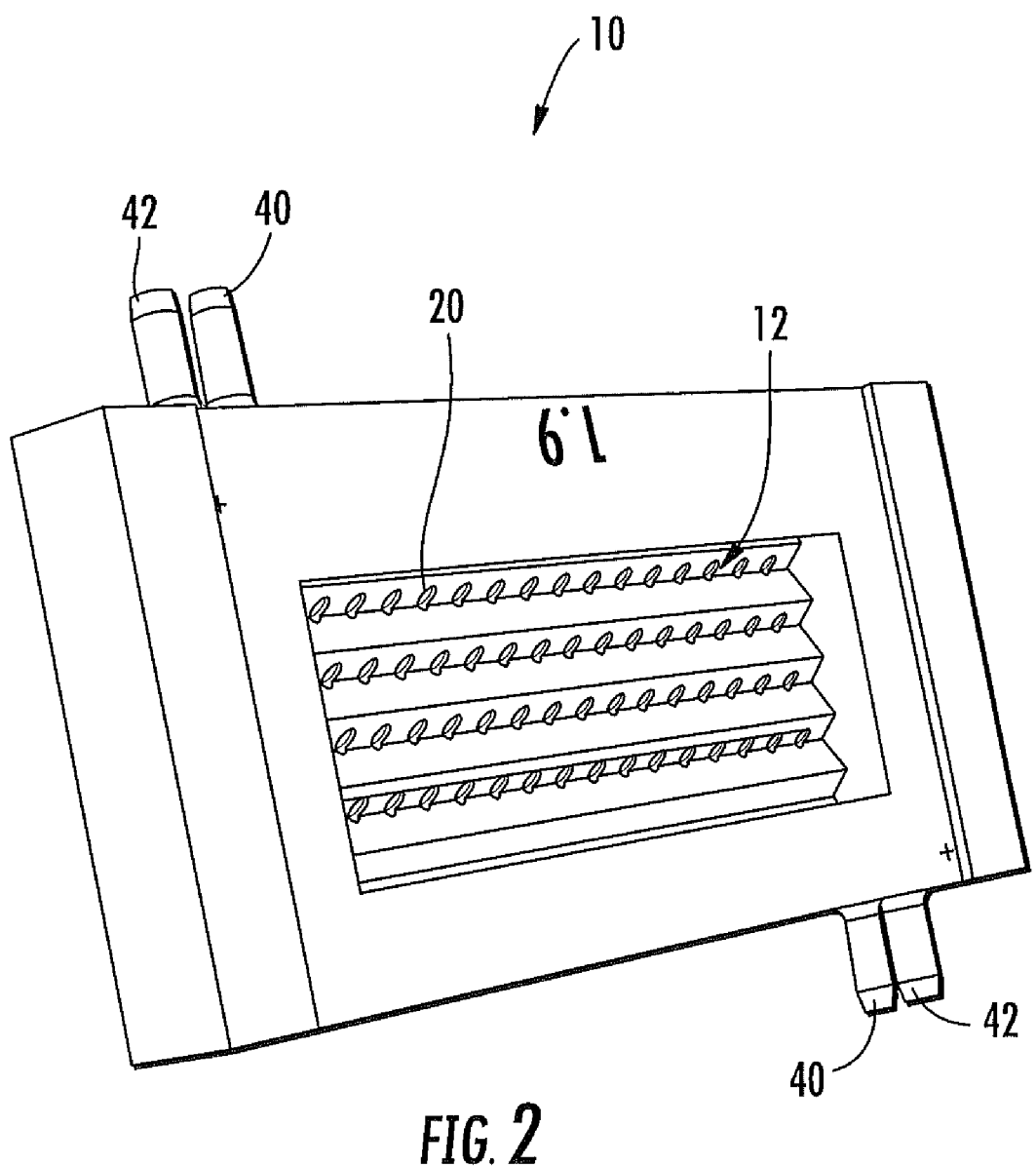
FIG. 2 is another top perspective view of the device of FIG. 1 opposite the view shown in FIG. 1.
Figure 3:
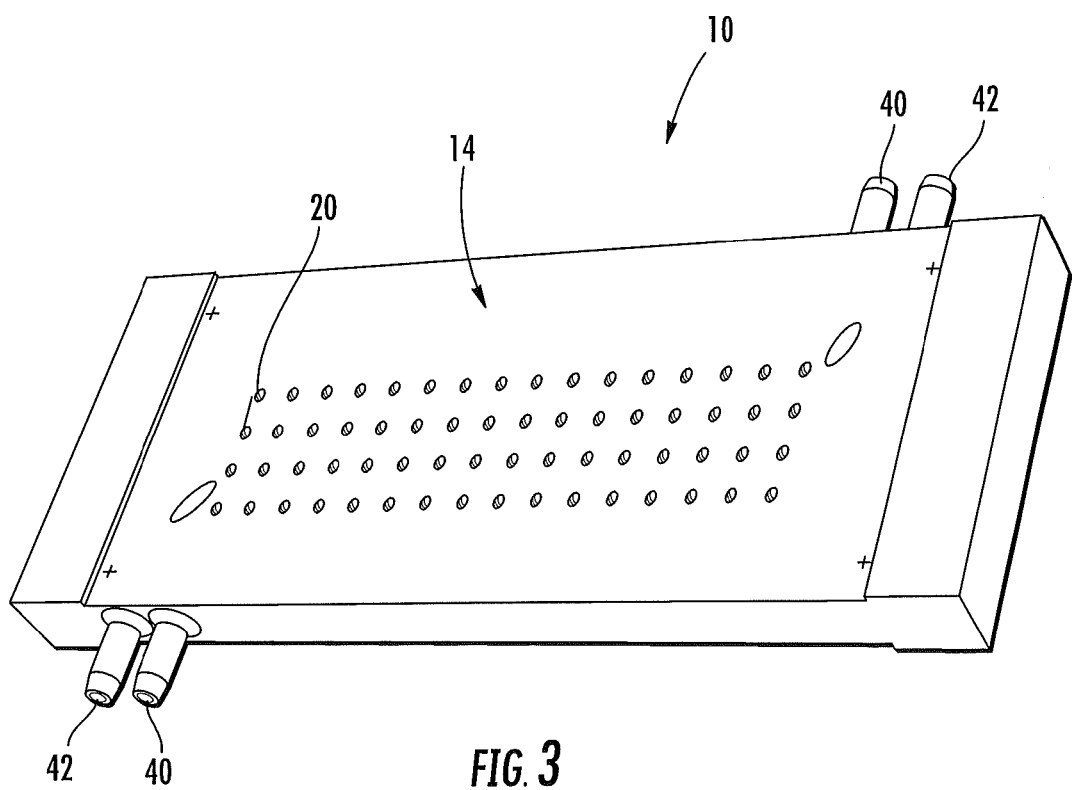
FIG. 3 is a bottom perspective view of the device of FIG. 1.
Figure 4:
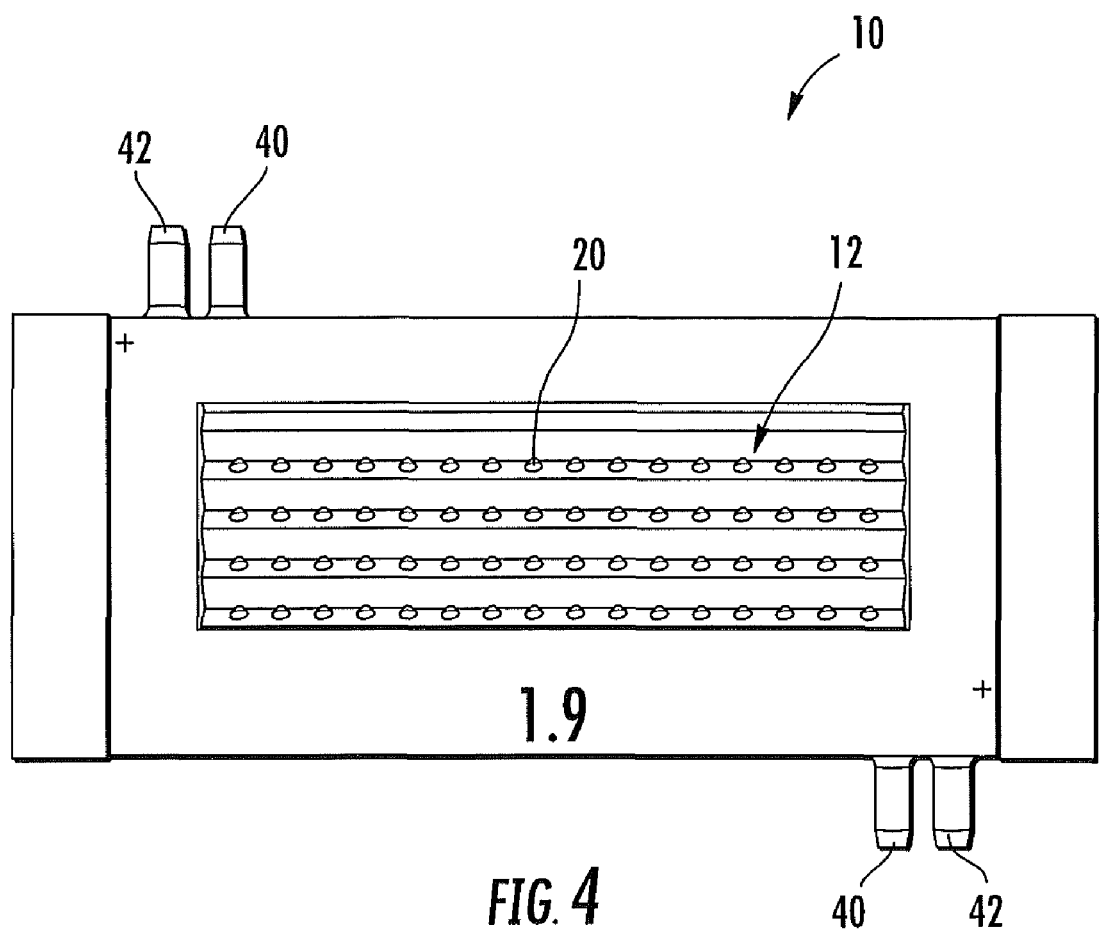
FIG. 4 is a top view of the device of FIG. 1.
Figure 5:
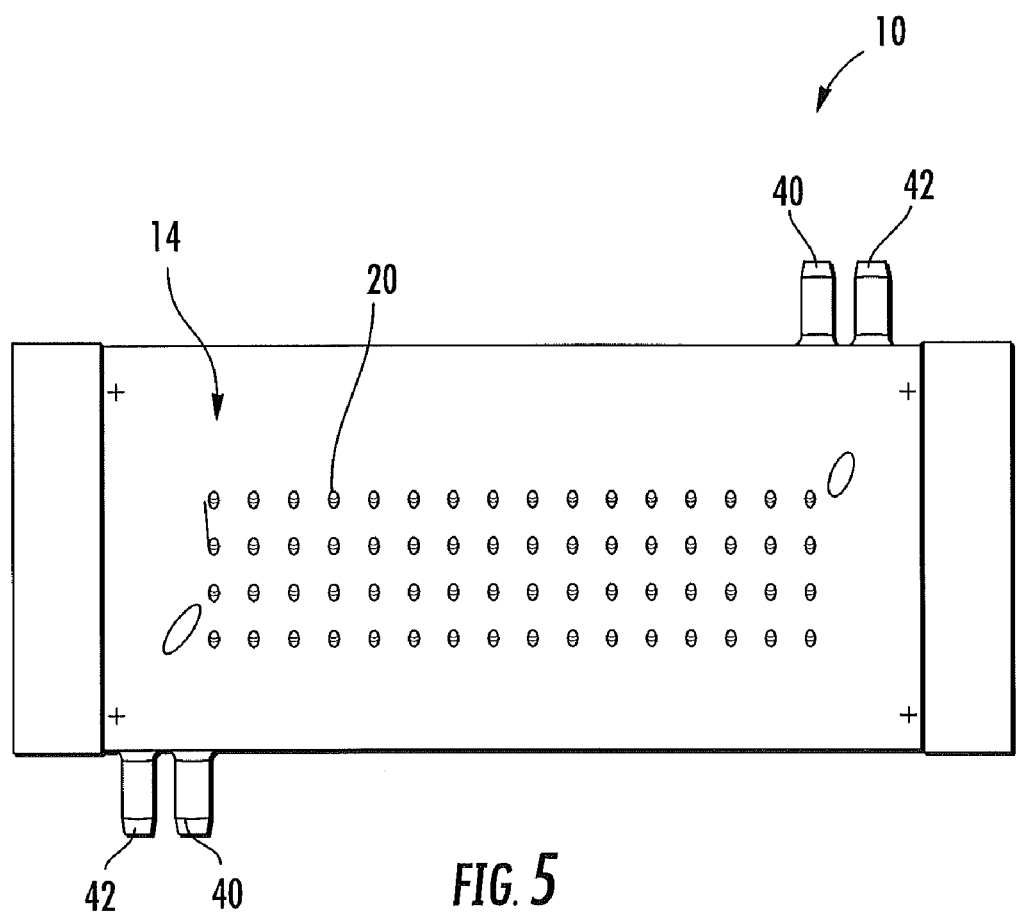
FIG. 5 is a bottom view of the device of FIG. 1.

Embodiments according to the present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium include, but are not limited to, the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium can even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

According to embodiments of the present invention, a plant growth array device includes an aerial growth chamber configured to receive aerial shoot portions of a plurality of plants and a root growth chamber configured to receive root portions of the plurality of plants. A dividing member may be between the aerial growth chamber and the root growth chamber and has a plurality of apertures for receiving the plurality of plants therein. The plurality of apertures are configured so that the root portions grow substantially in a common orientation.

Accordingly, the root portions may be imaged without requiring the removal of the root from the root growth chamber. For example, the root growth chamber can include a transparent and/or translucent side such that the root portions can grow substantially in the common orientation along the transparent and/or translucent side of the growth chamber. In some embodiments, the transparent and/or translucent side of the growth chamber is a microscope slide or coverslip. The transparent side may be an array of transparent material(s), such as multiple pieces of coverglass arranged to accommodate more growth area on larger embodiments. The device can be positioned in an imaging system, such as a microscope (for example, a confocal laser scanning microscope such as a Zeiss™ 510 confocal LSM), and the root portions may be imaged while remaining in the root growth chamber. Images may be obtained without removing the plant or portion of the plant from the growth environment. Therefore, a plurality of images can be obtained over time without disturbing the plant. Although embodiments according to the invention are described herein with respect to root imaging, it should be understood that the shoots, leaves or any other plant structure may also be imaged.

The dividing member can be configured to maintain a gaseous growth environment in the aerial growth chamber and a liquid growth environment in the root growth chamber. A gel growth media may be positioned in the plurality of apertures, for example, to divide the gaseous growth environment in the aerial growth chamber from the liquid growth environment in the root growth chamber, and to provide an immobilizing substrate for the plant. For example, seeds may be positioned in the gel growth media and seedlings/plants may grow therein; however, in some embodiments, plants or seedlings may be positioned in the growth media. Various dividing member designs may be used, including a plate with apertures or one or more layers of nylon mesh with double-sided adhesive films of the same or varying thickness. Various materials, including gel growth media, can be used to immobilize the seeds/seedlings and isolate the liquid and air growth chambers In particular embodiments, at least one conduit is configured to supply a fluid to one of the aerial growth chamber and/or the root growth chamber. A controller can be used to control a composition and/or amount of the fluid that is supplied to the aerial growth chamber and/or root growth chamber. The conduit and/or controller can be used to control the environment of the aerial growth chamber and/or the root growth chamber while the plurality of plants grow and develop. For example, plant nutrients can be provided in the fluid, which can be modified over time. Environmental pollutants may be added to or removed from the chambers. Gene induction or repression may be artificially controlled in transgenic plants by chemical and/or physical means such as, for example, by a steroid or laser.

In particular embodiments, illumination may be provided for the plants using light sources such as incandescent or fluorescent bulbs, LEDs, or some combination thereof to provide control of intensity and spectra of illumination. Light spectra, intensity, and duration may be programmed and controlled by a controller.

In particular embodiments, internal temperature controls may be held constant or in a gradient across the device and regulated externally by an electronic controller.

In specific embodiments, the plurality of apertures are semi-gibbous, and may extend at an angle, such as between 0 and 90 degrees, or about 45 degrees with respect to the dividing member. In some embodiments, fluid flow from conduits can be used to assist in the direct orientation of the roots, e.g., so that the fluid flows in the desired direction of root growth. In some embodiments, the apertures can be oriented at 90 degrees with respect to the dividing member and may have a tapered opening to the root growth chamber oriented at 90 degrees or less to orient the roots in a substantially common direction.

In particular embodiments, an array of micro-environmental sensors can be included in an internal chamber of the device to directly measure the environmental variables experienced by individual plants or root regions. These sensors may quantify local illumination, autofluorescence, temperature, pH, chemical composition, movement, or biota.

An alternative utility of the present device may include the fixation and or processing of plant tissues for light microscopy techniques, including clearing, chemical staining, GUS reporter staining, immunolocalization, and fluorescent in-situ hybridization.

As shown in FIGS. 1-5, 6A-6C, and 7-8, a plant growth array device 10 includes an aerial growth chamber 12 and a root growth chamber 14. The aerial growth chamber 12 and the root growth chamber 14 are separated by a dividing member, such as a plate 16. The plate 16 includes apertures 20. The apertures 20 include holding members 22 that extend through the plate 16. The device 10 further includes glass plates 30, 32 (FIG. 6A), which may be affixed with an adhesive, and conduits 40, 42. In some embodiments the fluid conduits 40, 42 may be on opposite sides of the device as shown in FIGS. 1-5 and 7 to bolster gravitational effects in operation and/or to mitigate fluid leakage between the aerial growth chamber 12 and the root growth chamber 14 through the dividing plate 16. However, fluid conduits 40, 42 may be positioned in any suitable location.

Figure 6A:
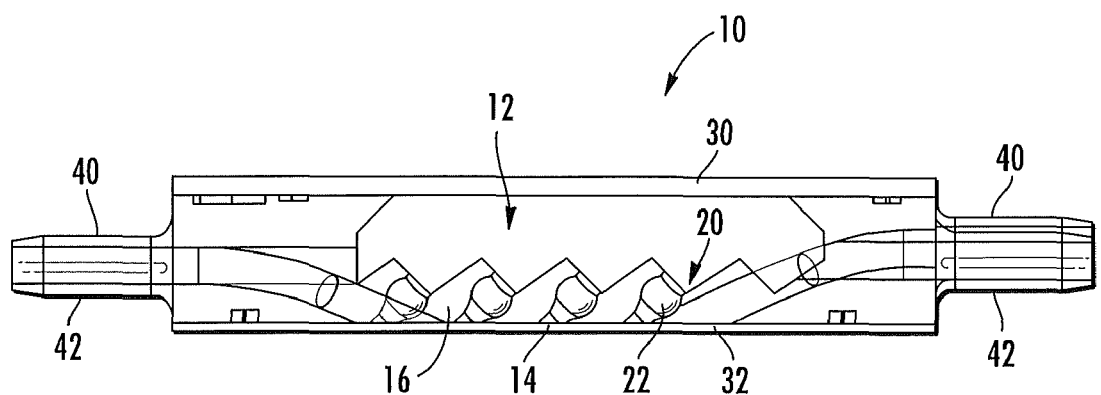
FIG. 6A is a cross sectional view of the device of FIG. 1.

In some embodiments, the fluid flow may encourage root growth in a particular direction, i.e., the direction of the fluid flow through the root growth chamber 14. The fluid conduits 40, 42 may be controlled by a controller (not shown) to control and/or regulate the environment in the chambers 12, 14. In some embodiments, the chambers 12, 14 can includes sensors that detect environmental parameters (temperature, light conditions, moisture conditions, nutrient conditions, etc.). As shown in FIG. 6A, the aerial growth chamber 12 and the root growth chamber 14 each have a transparent and/or translucent side thereof formed by the respective glass plates 30, 32. As illustrated, the glass plate 30 is held by an adhesive; however, the glass plates 30, 32 may be held by other suitable methods, including slots and/or tabs.

Although embodiments according to the invention are illustrated with respect to conduits 40, 42, it should be understood that other configurations of conduits for introducing fluid into the aerial growth chamber 12 and/or the root growth chamber 14 can be used. For example, a fluid may flow into the and out of the chambers 12, 14 from a plurality of ports to diffuse the fluid and provide substantially uniform or even flow to the plants in different areas of the array. In some embodiments, the conduits 40,42 can be connected to a manifold chamber (not shown). The manifold chamber can include a plurality of ports (e.g., a perforated plate interface with one of the chambers 12, 14) to diffuse the fluid flowing into the chambers 12, 14.

Figure 6B:
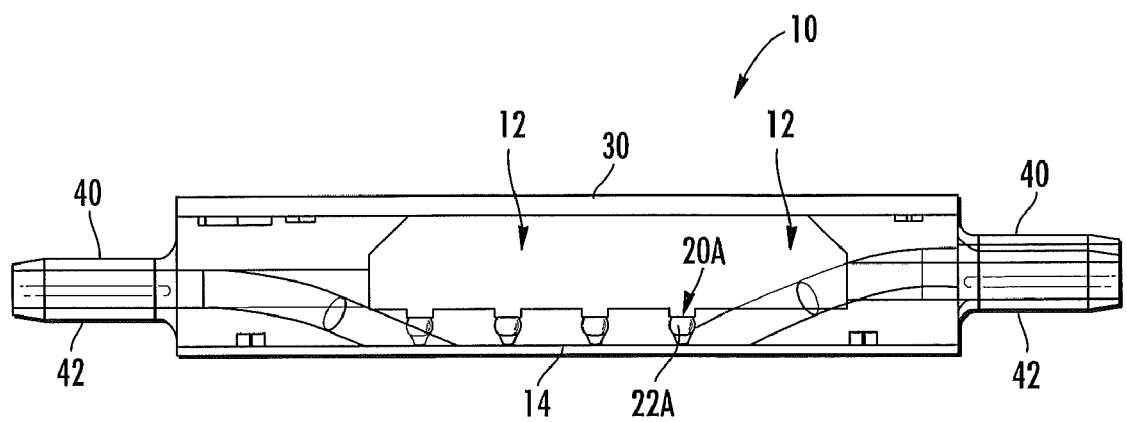
FIG. 6B is a cross sectional view of a plant growth array device according to further embodiments of the present invention.
Figure 6C:
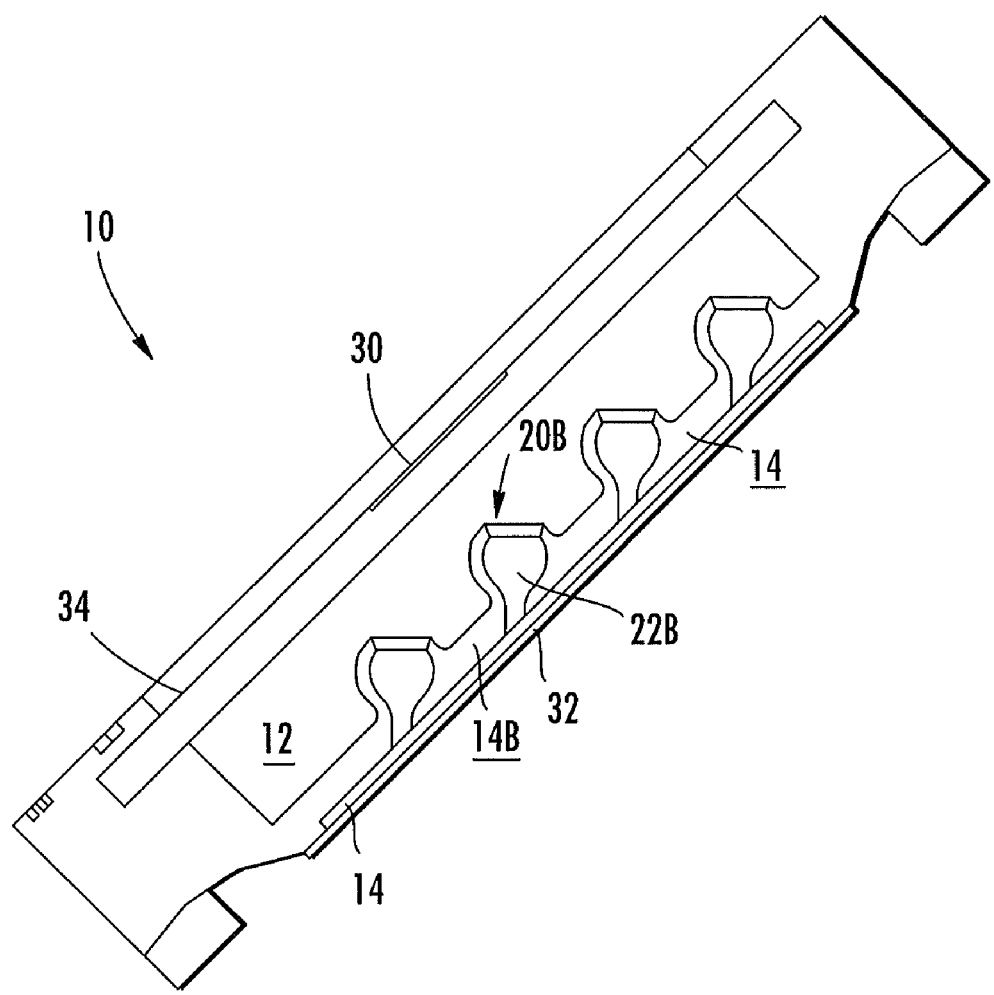
FIG. 6C is a cross sectional view of a plant growth array device according to further embodiments of the present invention.

The holding members 22 and/or apertures 20 can be positioned in any suitable configuration. For example, as illustrated in FIG. 6B, the holding members 22A are substantially perpendicular with respect to the major plane of the dividing plate 16A. As shown in FIG. 6C, the holding members 22B extend away from the plate 16 and into the aerial growth chamber 12.

Figure 7:
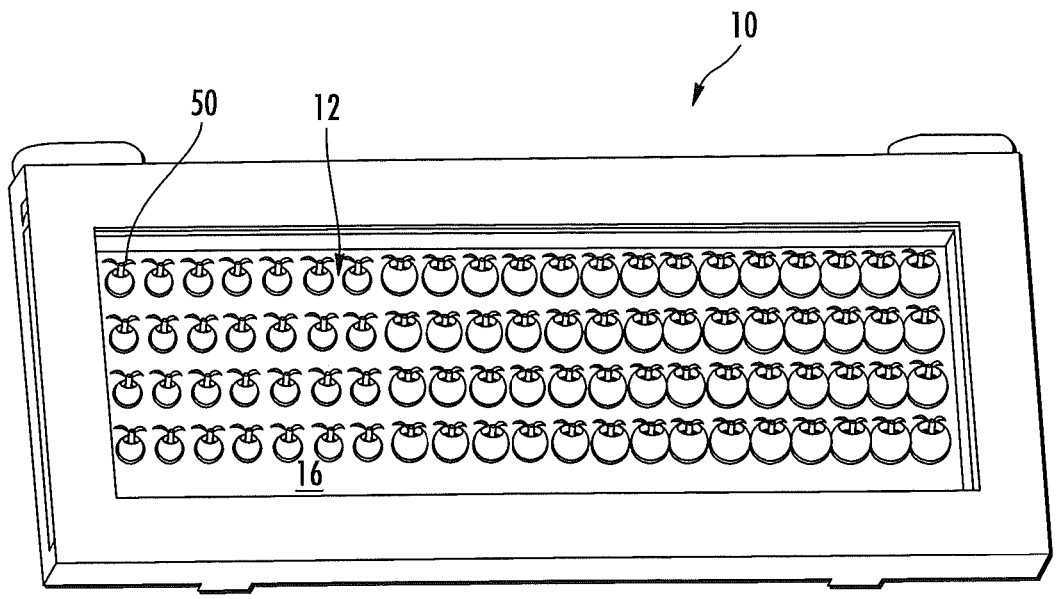
FIG. 7 is a perspective view of the device of FIG. 6C with plants growing in apertures of the device according to embodiments of the present invention.
Figure 8:
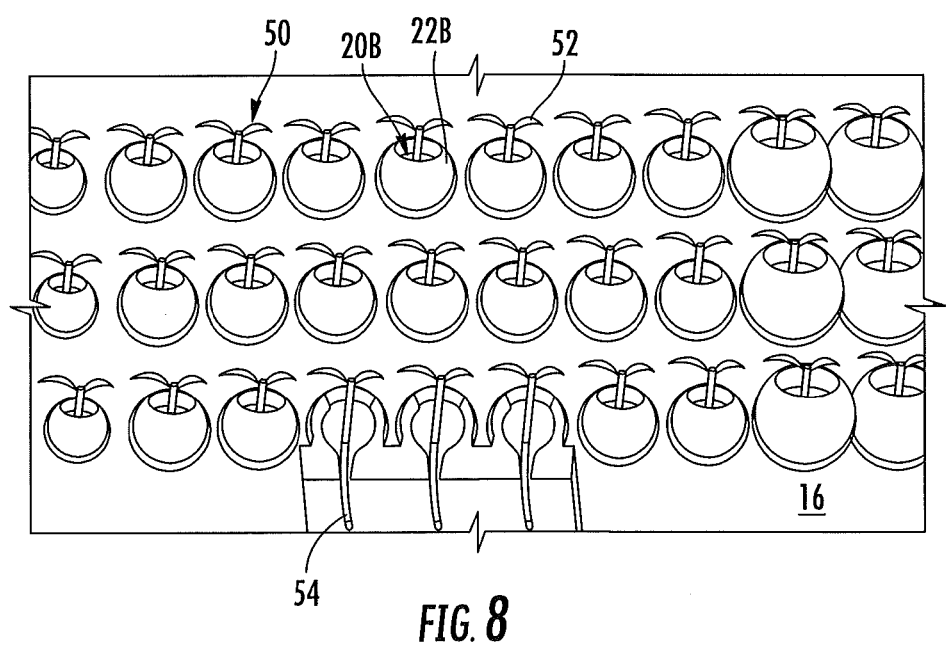
FIG. 8 is an enlarged, cut-away view of the device of FIG. 7.

As shown in FIGS. 7-8, a plurality of plants 50, which include aerial shoots 52 and roots 54, are received in the apertures 20B. In some embodiments, the plants 50 are *Arabidopsis thaliana* plants; however, any suitable plant may be used, including, but not limited to, plants with translucent roots for ease of imaging, for example, annual crops such as maize, wheat, rice, and soybeans. Non-transparent roots may also be used, particularly if the experimental focus is on external root features, such as branching architecture or mycorrhyzal associations.

As shown, in particular, in FIGS. 7-8, the apertures 20B are configured to receive the plurality of plants 50 such that the roots 54 grow substantially in a common orientation, such as along the glass plate 32 in the root growth chamber 14 (see FIGS. 3, 5 and 7-8). In this configuration, the glass plate 32 can be positioned in a microscope, such as a confocal laser scanning microscope, and images of the roots 54 may be obtained without removing the roots from the root growth chamber 14. Subsequent images may also be obtained at various times during the growth of the root 54. One or more of the plants 50 may be identified and removed from the device to be grown on soil for propagation, which may be useful for genetic screens.

For example, as shown in FIGS. 6A-6C, the apertures 20, 20A, 20B can form a channel and be tapered in an open-ended, semi-gibbous, conical or frusto-conical shape, which may guide the roots 54 along a common orientation, such as along the glass plate 32, while maintaining sufficient space for healthy root growth. The shape of the apertures 20, 20A, 20B may be generally spherical or semi-gibbous to accommodate the application of a droplet of molten gel, and which can be held in position after solidification. The apertures 20, 20A, 20B extend at an angle (e.g., between about 0 and 90 degrees, between about 20 and 75 degrees or about 45 degrees) with respect to the plate 16. In this configuration, gravity may further direct the growth of the roots 54 along the common orientation. In some embodiments, the device 10 can be oriented or re-oriented while the plants 54 are growing to encourage root growth in a common orientation. The holding members 22, 22A, 22B and/or apertures 20, 20A, 20B can have the same size, or different sizes of holding members 22, 22A, 22B and/or apertures 20, 20A, 20B may be provided on one device.

As shown in FIGS. 1-6A, 6B, 6C and 7-8, the device 10 is configured to maintain a gaseous growth environment in the aerial growth chamber 12 and a liquid growth environment in the root growth chamber 14. In some embodiments, a gel (such as a molten gel) may be positioned in the apertures 20, and seeds may be held in place on the gel. The gel can include nutrients, moisture, and other components that may encourage seed growth. Any suitable gel can be used, such as a low-melting temperature agarose, e.g., SeaPlaque 8 from Cambrex. In addition, the gel can further function to separate the liquid growth environment of the root growth chamber 14 from the gaseous growth environment in the aerial growth chamber 12.

In some embodiments, the conduits 40, 42 of 1-6A, 6B, 6C and 7-8 can be connected to one or more fluid supply devices (not shown). For example, a particular mixture of gases may be supplied to the aerial growth chamber 12 via the conduits 40 and/or a particular mixture of liquids may be supplied to the root growth chamber 14 via the conduits 42. In some embodiments, the components of the liquids and/or gases can be controlled by a controller and varied over time (e.g., by using a manual or automated valve system). For example, a pollutant introduced and/or the nutrients supplied to the chambers 12, 14 may be changed over time and any effects of the changes may be observed by imaging the roots as described herein.

According to embodiments of the invention, the spatial, temporal and/or environmental transcription pattern may be studied by imaging roots, shoot portions and/or any other portions of the plants 54. A gene expression data set for a multicellular organism may provide the number of steady state transcripts for one or more genes in one or more individual cells and/or one or more tissues, at one or more time point in the cell's development. Various environmental conditions and/or genetic backgrounds can be studied. Various methods have been used to determine the spatial accumulation of transcripts for a single gene, such as in situ hybridization and an expression DNA microarray [Brown and Botstein 1999, Yamada et al. 2003]. Other methodology to acquire spatial expression data for a larger number of genes by purifying cell-type specific RNA for microarray analysis uses fluorescence activated cell sorting of discreet GFP marked cell types [Birnbaum et al. 2003, Birnbaum et al. 2005, Brady et al. 2007]. However, these methods are generally non-vital, and consequently the time component of differential gene expression may be difficult or impossible to determine without using a large collection of independent samples over a time series. Transgenic reporters of expression have been used extensively recently, due in large part to the popularization of experimental GFP as a qualitative measure of where and when a single gene might be activated [Chalfie et al. 1994; Lee et al. PNAS 2006].

In some embodiments, real time images may be obtained from live plants without removing the plants from a growth medium. A plurality of plants may be grown in a similar environment on a chip to provide a high throughput device. Plant structures, including roots, shoots, and other plant structures, may be imaged. Embodiments of the present invention can also be used to image expression of reporter genes such as GFP. Embodiments of the present invention can provide quantitative expression data for a large set of genes (for example, transcription factor genes) at high spatial and/or temporal resolution, using a collection of transcriptional reporters (for example, GFP reporters). Suitable reporter genes include colorimetric and fluorescent reporters. The time course analyses of expression under a spectrum of environmental conditions can be provided by modulating stringently controlled liquid growth media in the root growth chamber. Cost advantages may be realized because existing confocal imaging equipment may be used. Moreover, although embodiments of the present invention are described with respect to the plant array growth device 10, other model organisms that are transformable and amenable to fluorescence imaging may be used, including yeasts (*Saccharomyces cerevisiae* and *Schizosaacharomyces pombe*), flies (*Drosophila melanogaster*), zebrafish (*Danio rerio*), the nematode (*Caenorhabditis elegans*), moss (*Physcomitrella*), or cell cultures of any suitable organism.

Some embodiments of the invention can be used to study plant development, including spatial and/or temporal gene expression. Gene expression patterns may be studied in response to external stimuli, including biological and abiotic stimuli.

Figure 9:
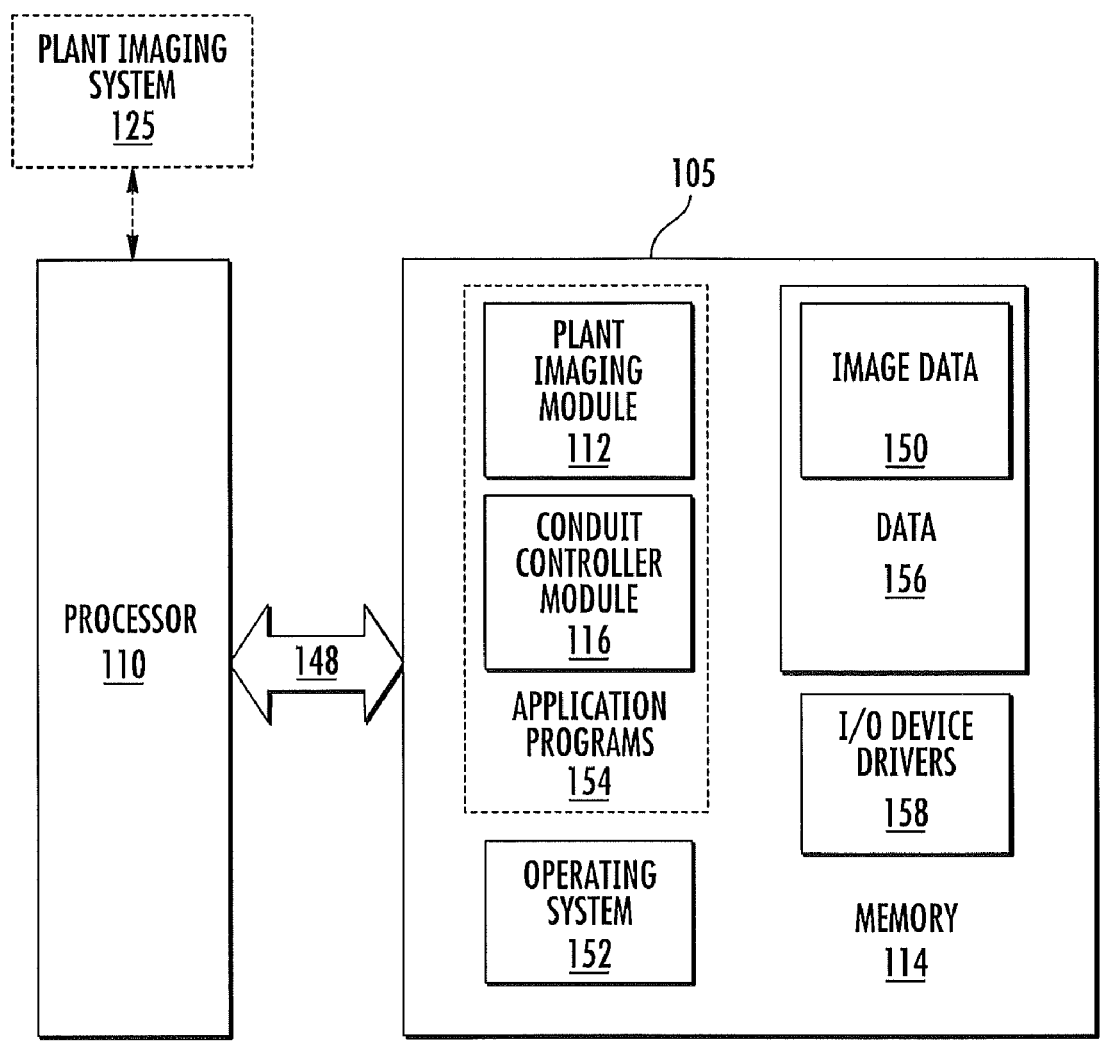
FIG. 9 is a schematic drawing of methods, systems and computer program products according to embodiments of the present invention.

FIG. 9 is a block diagram of exemplary embodiments of data processing systems that illustrates systems, methods, and computer program products in accordance with embodiments of the present invention. As illustrated in FIG. 9, a system 109 includes a processor 110, memory 114, an address/data bus 138, and a plant imaging system 125. The memory includes application programs 154 (such as a plant imaging module 112 and/or conduit controller module 116), data 156 (such as image data 150), I/O device drivers 158, and an operating system 152. The processor 110 communicates with the memory 114 via the address/data bus 148. The processor 110 can be any commercially available or custom microprocessor. The memory 114 is representative of the overall hierarchy of memory devices containing the software and data used to implement the functionality of the data processing system 105. The memory 114 can include, but is not limited to, the following types of devices: cache, ROM, PROM, EPROM, EEPROM, flash memory, SRAM, and DRAM.

The plant imaging system 125 can include a plant growth array, such as the device 10 as illustrated in FIGS. 1-6A, 6B, 6C and 7-8, a fluid supply system for supplying air and/or liquid fluids to the plant growth array, and/or an imaging device, such as a confocal laser imaging microscope for fluorescent root imaging.

As shown in FIG. 9, the memory 114 may include several categories of software and data used in the data processing system 105: the operating system 152; the application programs 154; the input/output (I/O) device drivers 158 and the data 156. The data 156 may include image data 150 which may be obtained from the plant imaging system 125. In some embodiments, the plant imaging system 125 includes an automated microscope, such as a robotic microscope. The plant imaging module 110 may control the movement of the microscope and/or various aspects of the plant imaging system 125.

As will be appreciated by those of skill in the art, the operating system 152 may be any operating system suitable for use with a data processing system, such as OS/2, AIX, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView or proprietary operating systems. The I/O device drivers 158 typically include software routines accessed through the operating system 152 by the application programs 154 to communicate with devices such as I/O data port(s), data storage 156 and certain components of the memory 114 and/or the plant imaging system 125. The application programs 154 are illustrative of the programs that implement the various features of the data processing system 105 and preferably include at least one application that supports operations according to embodiments of the present invention. Finally, the data 156 represent the static and dynamic data used by the application programs 154, the operating system 152, the I/O device drivers 158, and other software programs that may reside in the memory 114.

The plant imaging module 112 can be configured to obtain and/or control images from the plant imaging system 125. It may be desirable to obtain detailed images of the roots 54 of FIGS. 7-8 or portions of the roots 54 (e.g., root ends or tips) without necessarily obtaining detailed images of the entire root growth chamber 14. In some embodiments, the plant imaging module 112 is configured to obtain one image that can be used to identify regions for detailed imaging. For example, the location of a region or regions that includes root portions of the plants can be obtained from an initial image. More detailed images, including images with a higher resolution, can then be obtained at the identified locations. The initial image may be obtained from a microscope, camera or other imaging device. The initial image and the more detailed image(s) can be obtained from the same device or from a different device. The initial image may be a concatenated two or three-dimensional image compiled from a series of images that capture the entire space of root growth. In some embodiments, the plant imaging module 112 can control an automated or robotic microscope to image the identified regions.

The conduit controller module 116 can control a fluid supply to the growth environment of plants, for example, via the conduits 40, 42, to provide a particular gaseous or liquid environment to the aerial growth chamber 12 and the root growth chamber 14, respectively. For example, the fluid supply may be provided by a peristaltic pump with automated or manually operated valves. Any suitable commercially available or customized nutrient solutions can be used to provide a liquid growth environment. One example is a nutrient solution having 4.3 g/L Murashige and Skoog salts (w/macro and micro nutrients), 0.5 g/L MES, and 10 g/L sucrose.

Although embodiments of the present invention are illustrated, for example, with reference to the plant imaging module 112 and/or conduit controller module 116 being application programs in FIG. 9, as will be appreciated by those of skill in the art, other configurations may also be utilized while still benefiting from the teachings of the present invention. For example, the modules 112, 114 may also be incorporated into the operating system 152, the I/O device drivers 158 or other such logical division of the data processing system 105. Thus, the present invention should not be construed as limited to the configuration of FIG. 9, which is intended to encompass any configuration capable of carrying out the operations described herein.

The I/O data port can be used to transfer information between the data processing system 105 and the plant imaging system 125 or another computer system or a network (e.g., the Internet) or to other devices controlled by the processor. These components may be conventional components such as those used in many conventional data processing systems that may be configured in accordance with the present invention to operate as described herein.

Figure 16:
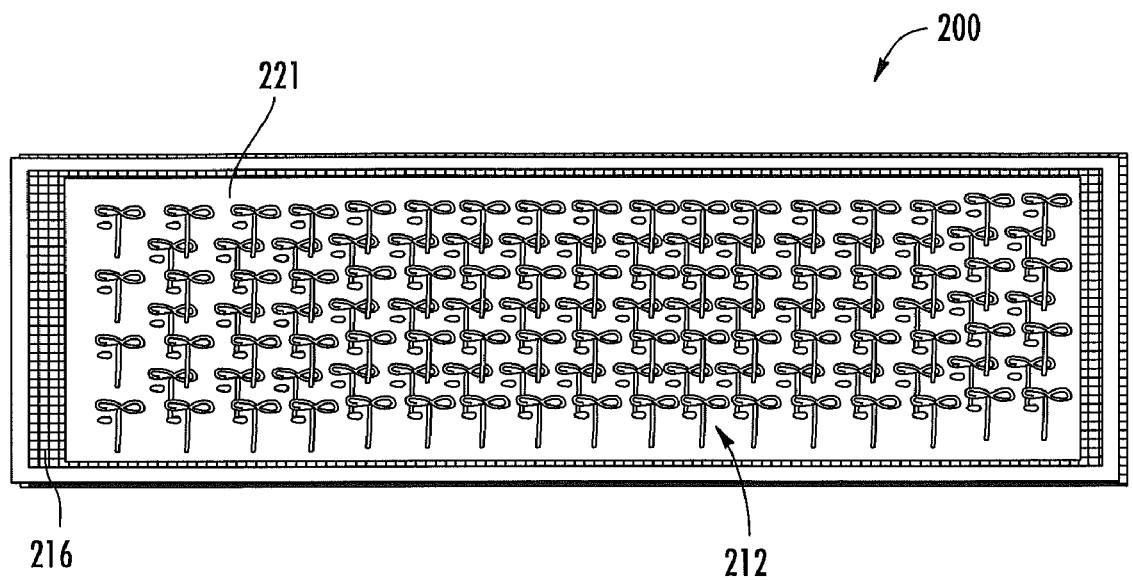
FIG. 16 is a top view of a plant growth array device according to further embodiments of the present invention.
Figure 17:
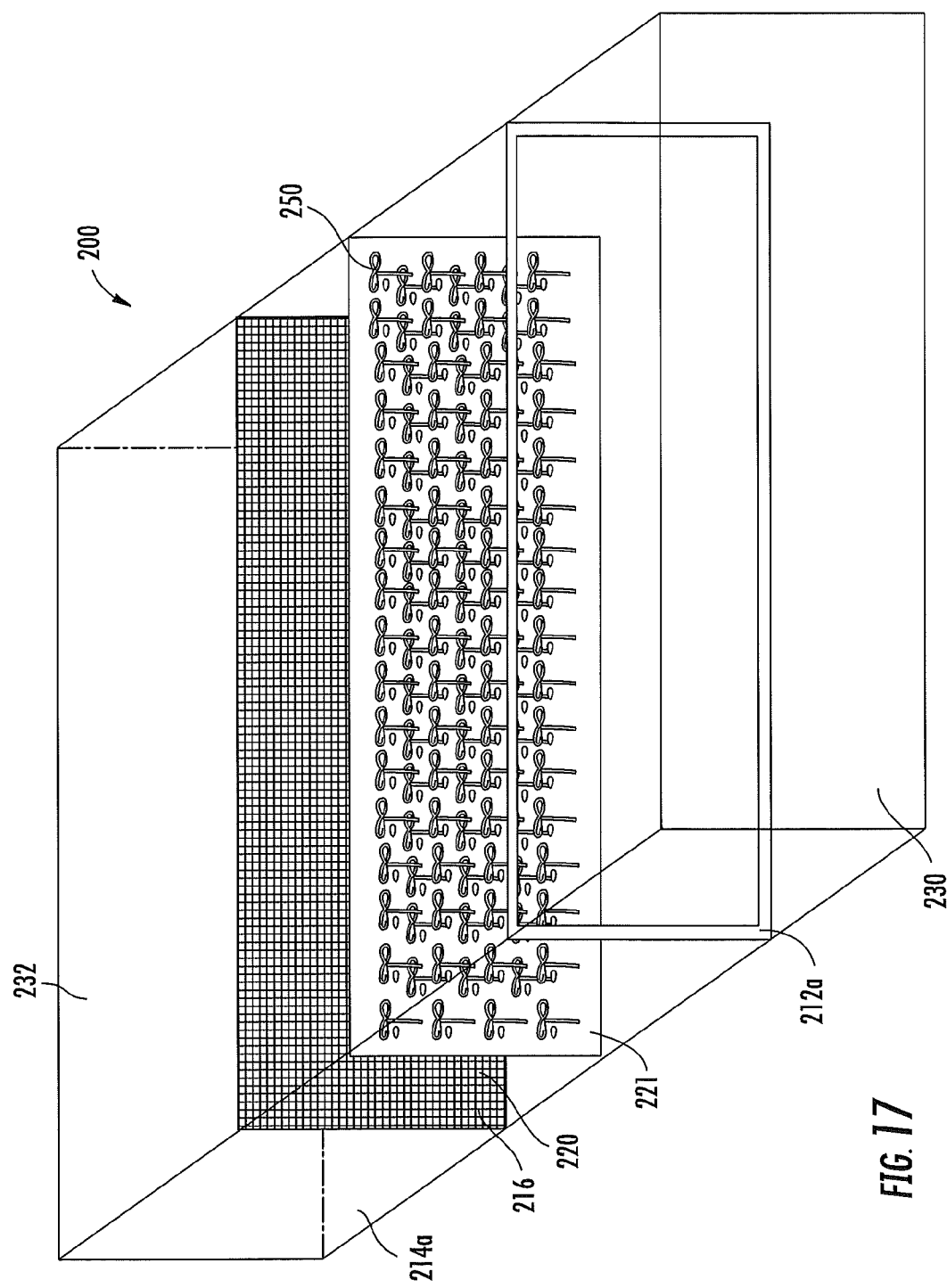
FIG. 17 is an exploded view of the plant growth array device of FIG. 16.
Figure 18:
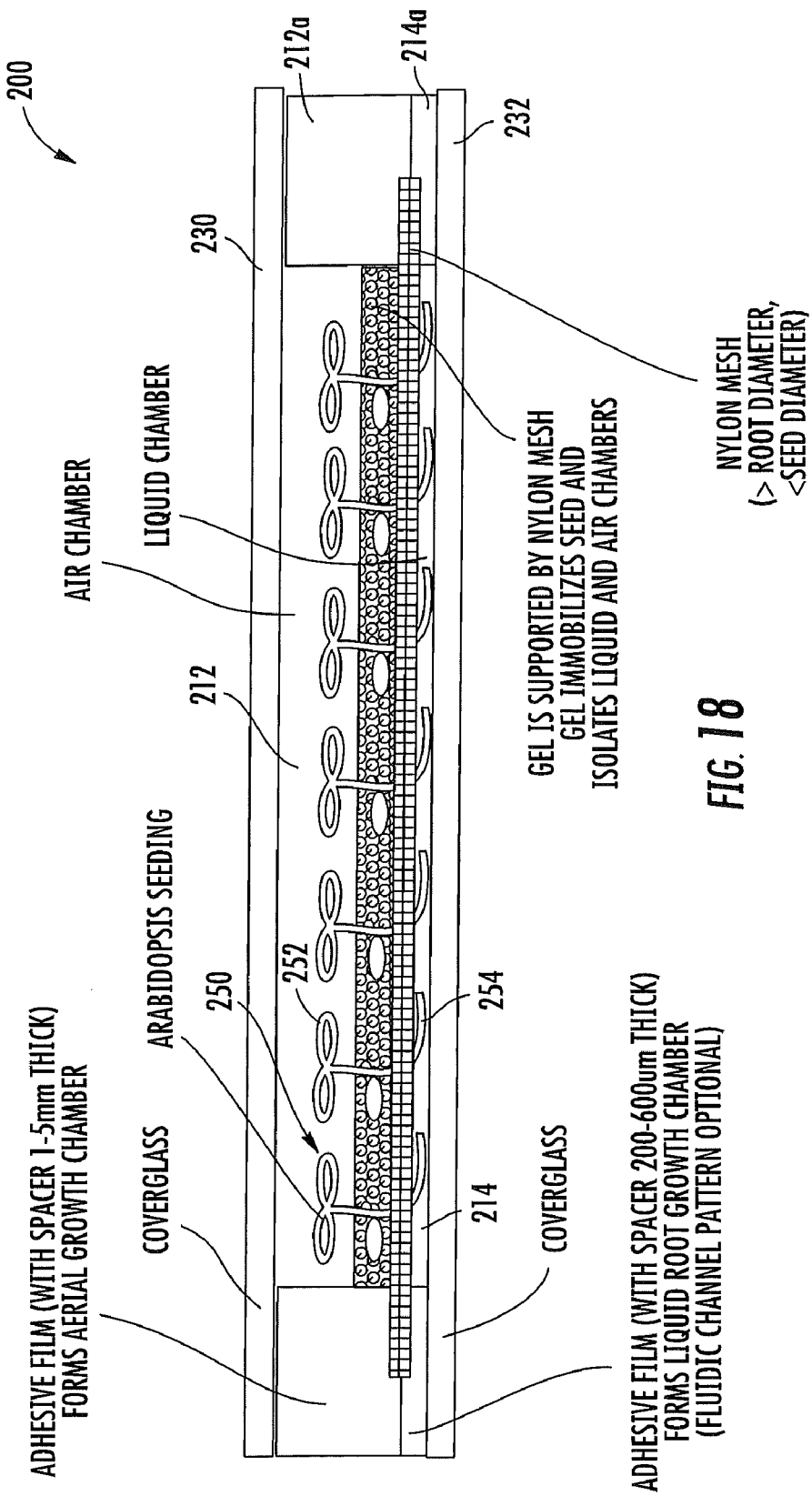
FIG. 18 is a cross sectional view of the plant growth array device of FIG. 16.

Those skilled in the art will recognize that the plant growth array device 10 of FIGS. 1-6A, 6B, 6C and 7-8 may take other configurations. For example, a plant growth array device 200 is shown in FIGS. 16-18. The device 200 includes an aerial shoot growth chamber 212 and a root growth chamber 214 that is divided by a wire mesh divider 216. The wire mesh divider 216 includes apertures 220 therein. The aerial shoot growth chamber 212 includes an adhesive film 212a, a glass cover slip 230, and a gel 221. The adhesive film 212a separates the divider 216 from the cover slip 230 to form the chamber 212. The root growth chamber 214 includes an adhesive film 214a and a glass cover slip 232. The adhesive film 214a separates the divider 216 from the cover slip 232 to form the chamber 214. The mesh divider 216 supports the gel 221. The gel 221 can immobilize seeds and/or isolate the chambers 212, 214.

As shown in FIG. 18, plants 250 grow such that shoot portions 252 of the plants 250 extend into the aerial growth chamber 212 and root portions 254 of the plants 250 extend into the root growth chamber 214. The shoot portions 252 and/or the root portions 254 may be imaged as discussed herein by positioning a microscope or other imaging device adjacent the glass cover slip(s) 230, 232.

In particular embodiments, the adhesive film 212a forms a spacer that is about 1-5 mm thick and the adhesive film 214a forms a spacer that is about 200-600 µm thick.

Fluid exchange ports (not shown) may be used to control a gaseous environment in the aerial shoot chamber 212 and/or a liquid environment in the root growth chamber 214. In addition, the adhesive film 214a may include a fluidic channel pattern for directing fluid flow from a liquid exchange port.

Although embodiments according to the present invention are described with respect to confocal laser scanning microscopy imaging devices, other imaging devices can be used. Various types of light microscopy, including brightfield, dark field and differential interference contrast microscopy, may be used. Fluorescence microscopy, multi-photon microscopy, optical coherence tomography and deconvolution microscopy may be used.

Moreover, the devices described herein can be used to perform various imaging methodologies, including, without limitation, fluorescence lifetime imaging (FLIM), bi-molecular fluorescence complementation (BiFC), fluorescence (Förster) resonance energy transfer (FRET), Bioluminescence Resonance Energy Transfer (BRET), fluorescence correlation spectroscopy (FCS), calcium sensor imaging (and other signaling sensors), auxin reporter imaging (and other hormone sensors and reporters), cell cycle reporter imaging, subcellular structure reporter imaging, chemical or physical perturbation of development, cell lineage analysis, laser uncaging experiments, chromophore assisted light inactivation (CALI), chemically inducible spatial activation of gene expression, and/or chemically inducible spatial inactivation of gene expression.

Embodiments according to the present invention will now be described with respect to the following non-limiting examples.

EXAMPLES

*Arabidopsis thaliana* seedlings can be grown in the device 10 shown in FIGS. 1-6A, 6B, 6C and 7-8 and the roots and/or shoots may be imaged/monitored using the system 105 of FIG. 9. The *Arabidopsis* root may be used as a model system to understand the genetic control of development. Differences in gene expression over time and/or responses to external stimuli and environmental conditions (such as pollutants, toxins, hormones, light, nutrients, oxygen, carbon dioxide and other gases, water, draught conditions and the like) between cells types can be detected. For example, the nature of tissue specific gene regulation in the root may be studied at a genomic level and quantitative gene expression data in high temporal and spatial resolution in the root may be obtained. The dynamics of genome expression regulation over time during development and in response to external stimuli may be studied. In particular, dynamic transcription networks and development can be studied in response to environmental stimuli, and time-lapse three dimensional imaging of growing roots may be performed. Responses to external stimuli and environmental conditions, such as pollutants, toxins, hormones, light, nutrients, oxygen, carbon dioxide and other gases, water, drought conditions and the like may be observed.

Non-invasive confocal imaging may be used with a large collection of plants, each harboring a unique fluorescent expression reporter. Fluorescence image analysis may serve as a real-time proxy for characterizing expression dynamics. The device 10 of FIGS. 1-6A, 6B, 6C and 7-8 can be used to grow the plants in a controllable liquid growth environment.

The microscopy images using confocal or other methods may provide a rich source of data beyond the quantification of gene expression reporters. The images may be used for morphological analyses of developmental and physiological dynamics. Gene expression data can thus be correlated with morphometric data quantifying the dimensions, volume, and arrangements in three-dimensional space of the organisum's subcellular components, cells, tissue layers, and organs.

Device Design

Figure 14:
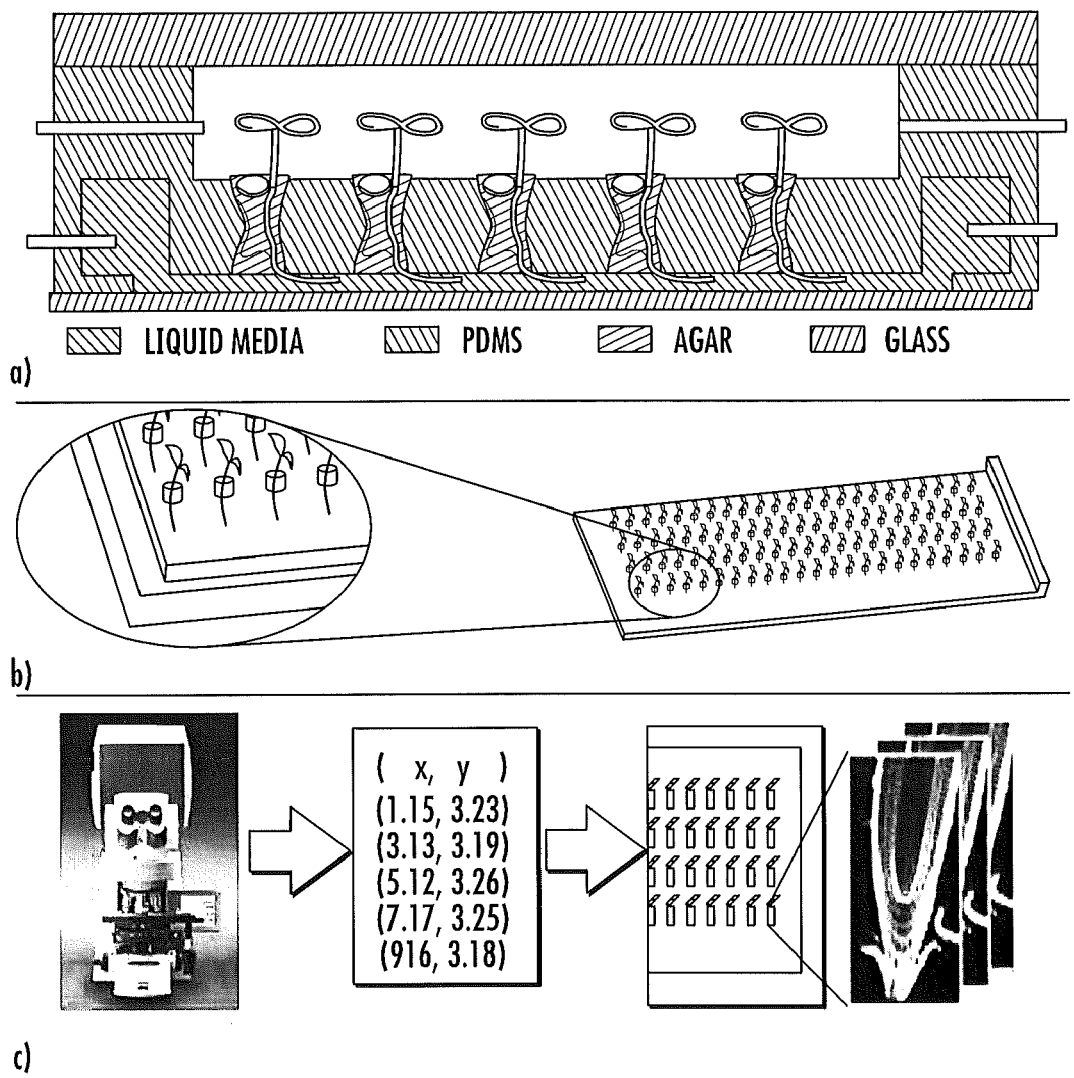
FIGS. 14A-14B are schematic diagrams of devices according to embodiments of the present invention.
FIG. 14C is a schematic diagram illustrating scanning routines according to embodiments of the present invention.

The design and fabrication techniques to form plant growth devices described herein are strategically flexible allowing for simple and inexpensive modification to accommodate different imaging platforms or experimental goals. In some embodiments, plant growth devices described herein can be formed of molded silicone elastomer (polydimethylsiloxane [PDMS] Dow Corning SYLGARD 184) and a transparent side can be provided by a microscope coverslip, such as a coverslip having a thickness of glass (~0.15 mm). Other suitable materials may be used. Optically clear and biologically inert silicone may be molded to contain liquid growth media between it and the glass to which it is secured, as shown, for example, in FIG. 14A. Array designs may be generated using the SolidWorks™ three-dimensional CAD program and are exported to a stereolithography apparatus (SLA) for fabrication using materials such as VeroBlue FULLCURE 840 photopolymer or those available from DSM Somos, Elgin, Ill. (USA) (for example Watershed 11120, NanoTool, ProtoTherm 12120). For example, SLA can be used to generate a plastic (photopolymer) mold, in which a silicone array could then be cast. Alternatively, the SLA technique can be used to fabricate the array itself out of the photopolymer plastic or another suitable SLA material. Small openings molded in the silicone component may be filled by fine mesh or solid low melting point agar, which immobilizes the seed but allows the young root to grow down into the liquid growth environment and along the glass (FIG. 14B). The shallow space (~200-600 microns) where the root grows may ensure that the root stays within the working distance of the microscope, yet provides sufficient root interaction with the environment to sustain a healthy plant. The stems and leaves of the plants may be grown in a sealed volume of air to reduce or prevent desiccation during imaging. Although the apertures in which the roots grow are illustrated as having an hour-glass shape, other configurations can be used, including frusto-conical and semi-gibbous shapes. Alternative fabrication techniques include techniques that can involve photolithography to generate layers of the device structure that can be bound to glass following plasma cleaning [McDonald et al. 2000], or using layers of die-cut double-sided adhesive films or tapes and mesh. In some embodiments, a high density of roots can be obtained, such as up to 96 for a 25×75 mm slide. However, larger and smaller dimensions may be used. For example, the number of roots practical for imaging may be limited by the scanning range of the robotic microscope stage; consequently, more plants can be imaged using a custom built stage and an array device of greater dimensions.

Control of Liquid and Gaseous Growth Environments

In some embodiments, fluids may be supplied to plant growth array devices. For example, conduits 40, 42 of FIGS. 1-6A, 6B, 6C and 7-8 can be inlet and outlet ports for a fluid and a gas, respectively, and may be configured for liquid media exchange. Liquid exchange may be achieved using a low flow multichannel peristaltic pump. This peristaltic pump can be used to exchange air, and can be used to manipulate the aerial as well as the root growth environment of the plants. Manual or programmable valves operated by software, such as the conduit controller module 116 of FIG. 9, and the manual or computer-controlled valves can be used to change the liquid media source. An exemplary liquid growth media is 1% Murashige and Skoog liquid media supplemented with 1% sucrose. Optimization or modification of the liquid growth media, such as by supplementary oxygenation, may be tested.

Counterstaining of Cell Boundaries

Imaging cell walls of the root can be achieved by using vital concentrations of the fluorescent stain FM-464. The potential issues of cost for this dye are sufficiently mitigated by the low working concentrations and low volume required by devices according to embodiments of the invention. Optionally, staining intensity can be automatically regulated by the image analysis programs that control a valve mixing additional dye. An alternative method to image root cell boundaries involves a transgenic approach or the use of propidium iodide or other alternative stains.

Automated Image Acquisition

Strategies for high-throughput and hands-free imaging may use a Zeiss 510 confocal LSM with a robotic "x-y" stage and robotic "z". A custom high-speed imaging platform can be developed for a confocal, spinning disk capability, or conventional microscope. Scanning efficiency can be improved by imaging only the regions of interest (ROI). Unlike other types of arrays where samples are in a predetermined position, the devices according to embodiments of the invention can allow roots room to grow within a somewhat restricted region (e.g., apertures in the dividing member of the array) to access to a liquid growth environment. Sufficient space can be allowed to permit healthy plant growth. A computer based image recognition algorithm can be developed to allow magnification of a quick bright-field scan of the entire array for automated determination of the "x" and "y" ROI coordinates, followed by high resolution confocal scanning as shown in FIG. 14C. Various methods have been proposed for finding the root coordinate in the z-axis. A scanning auto focus routine may be used to find the top or bottom boundary of the root, and then approximate the median section to be 75 microns internal from that point. Alternatively a fluorescent marker for the central cells in the root tip can be used for an auto focus routine. Third, using the theories behind image deconvolution, interpretation of the out-of-focus bright field images may provide information to determine the distance of the root from the focal plane. An alternative solution to determining ROIs would be to use an imaging platform with simultaneous multichannel fast wide field capture to speed up the acquisition of an unguided tiling scan, saving data selection until after image capturing. Techniques described in U.S. Pat. No. 6,115,111 to Korah et al. (the disclosure of which is hereby incorporated by reference in its entirety) may be used.

Calibration Of Quantitative Confocal Root Image Analysis of GFP Fluorescence as a Reporter for the Activity of Gene Promoter Regions The image analysis can be calibrated to independent measurements of GFP mRNA and fluorescence for each cell type in the root. Three-dimensional confocal images can be used for quantitation, and the root's optical properties can be modeled to account for attenuation and scatter of light due to depth.

Transcriptional Response to External Stimuli

An experiment using a steroid inducible protein known to activate a fluorescent transcriptional reporter can be used. The device 10 may be used in conjunction with projects studying nutrient deprivation or toxicity and abiotic stress or stimulation. The dynamic response of a collection of tissue-enriched transcription factors may be compared between environmental stimuli.

Figure 10A:
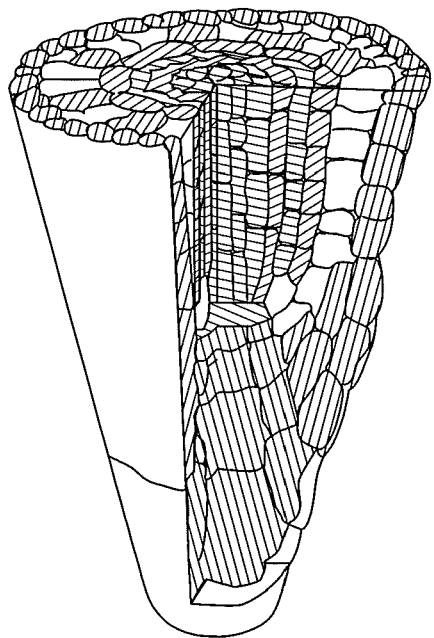
FIG. 10A is a schematic diagram of a typical plant root.
Figure 10B:
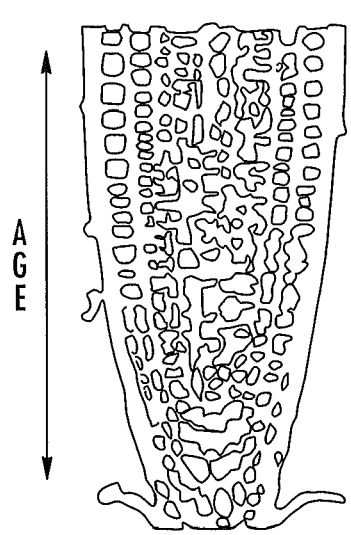
FIG. 10B is an image of an *Arabidopsis* root made with fluoroscope imaging techniques according to embodiments of the present invention.

The *Arabidopsis thaliana* root is one of the most tractable experimental models for development in plants. A fully sequenced genome, public gene mutant collections, transformability, and accessibility of commercially made expression microarrays provide efficient tools for experiments at a genomic level [Somerville and Dangl 2000]. The root's simple and stereotypic anatomy makes it generally well-suited for developmental genetics studies. The degree of rotational symmetry, transparency, small size, and its meristematic growth pattern distinguish the root as a uniquely well-suited multicellular organ for the implementation of high-throughput automated confocal technology. A single two-dimensional (2D) image through the median longitudinal axis is largely representative of the entire three-dimensional (3D) structure. Cells further from the meristematic growth center are progressively older and more differentiated. Consequently the same 2D image also represents a developmental time component as seen in FIGS. 10A-10B. Root growth can be mathematically modeled over time for studies of cell expansion and divisions, and used to probe underlying molecular mechanisms of cell morphogenesis and gravitropism [Beemster and Baskin 1998, Grabov et al 2005, Swarup et al. 2005]. Quantitative morphometric analysis of confocal time lapse images from the shoot apical meristem may be used to model an example of spatial hormone signaling and a reaction-diffusion mechanism [deReuille et al. 2006, Jonsson et al. 2005].

Root and/or shoot and/or any other portion of plants can be imaged in an undisturbed growth environment to perform time-lapse root imaging. Embodiments according to the invention can provide an automated or high-throughput imaging system and may increase the power and accessibility to a new spectrum of detectable microscopic phenotypes for genetic and chemical screens. A dynamic liquid media exchange system, such as that provided by the conduits 40, 42, may allow for many types of "experiments on a chip" ranging from investigation of nutrition, hormone biology, stress response, or engineered gene induction. Identifying promoter reporters that respond to specific chemicals or stressful environmental conditions may guide the development of transgenic bio-sensors useful for agricultural or environmental monitoring.

Figure 11:
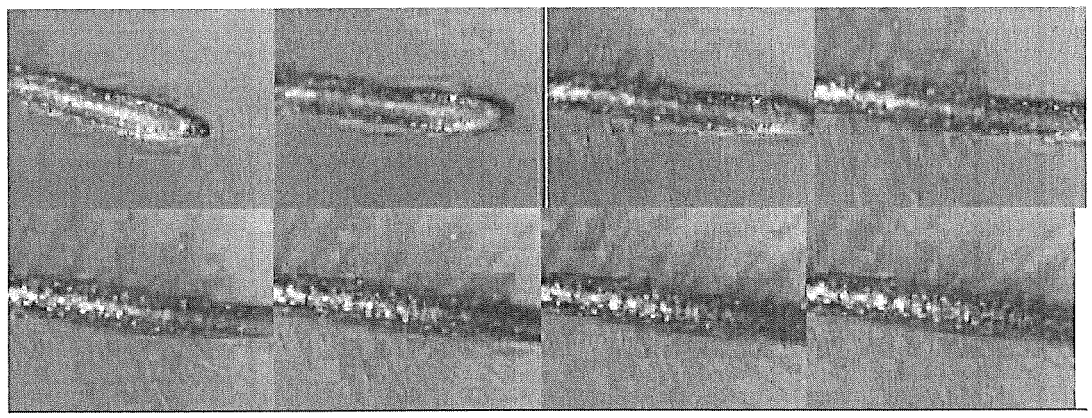
FIG. 11 is a time-lapse sequence of merged epifluorescence and differential interface contrast microscopy images showing an *Arabidopsis* root expressing a nuclear GFP reporter according to embodiments of the present invention in which images capture dynamics of root hair growth and coordinated nuclear migration.
Figure 12A:
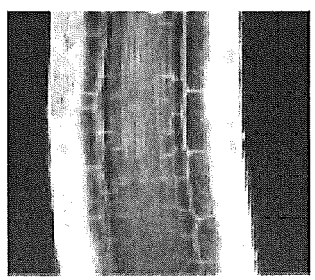
FIGS. 12A-12B illustrate image alignment and GFP detection for root imaging according to embodiments of the present invention.
Figure 12A:
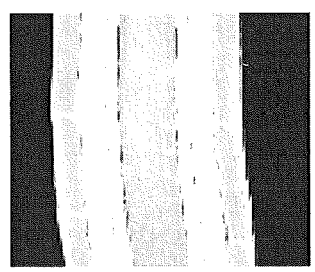
Figure 12A:
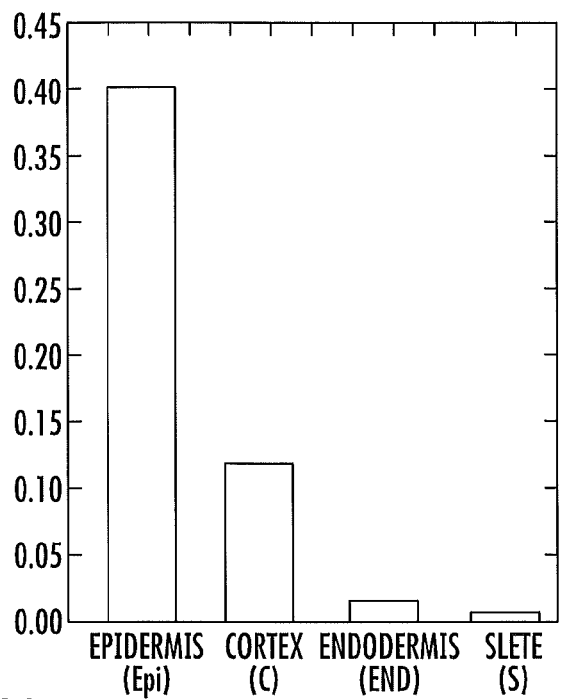
Figure 12B:
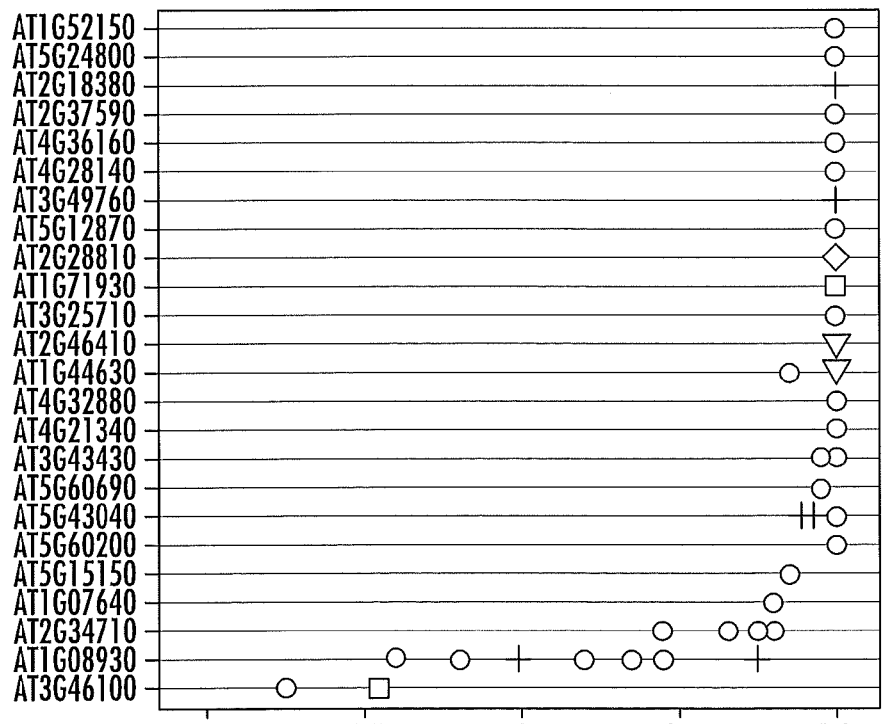
Figure 13A:
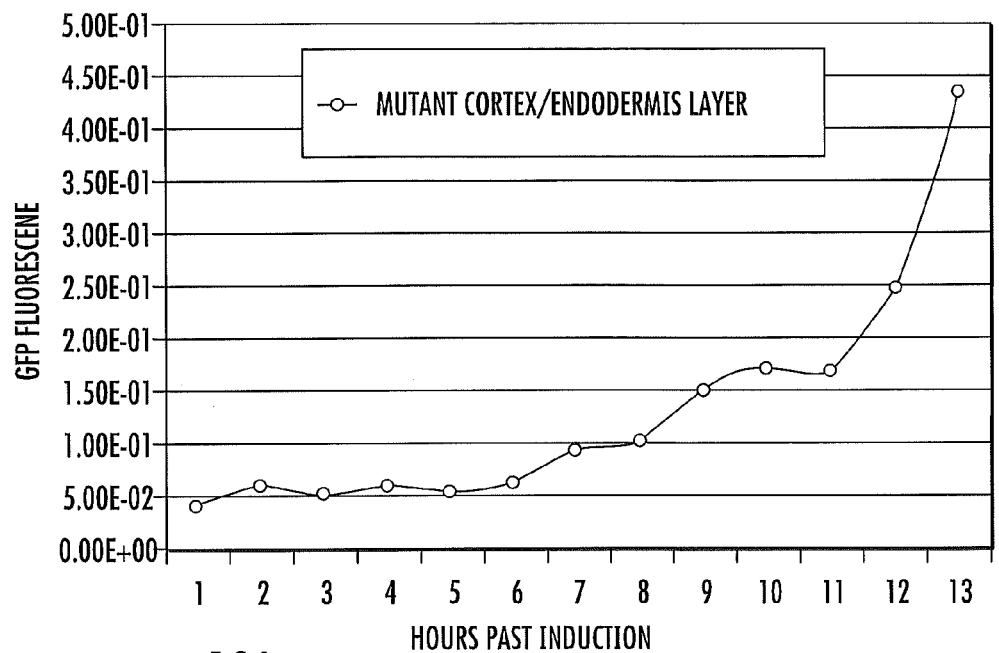
FIG. 13A is a graph of GFP fluorescence as a function of time for single tissue layer of an *Arabidopsis* root according to embodiments of the present invention.
Figure 13B:
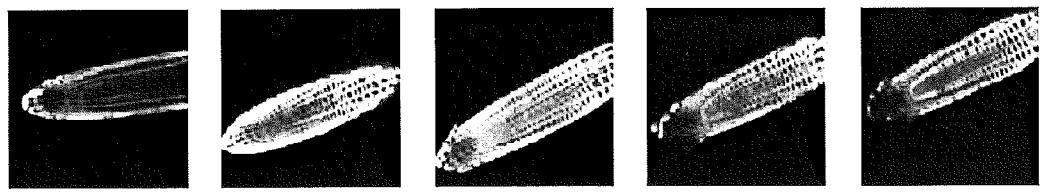

A time-lapse imaging sequence of a healthy growing root expressing a nuclear GFP reporter is show in FIGS. 11 and 13B. The overlay of differential interference contrast (DIC) and epifluorescence images captures the dynamics of root hair growth and coordinated movement of the nucleus within these cells.

The analysis of confocal images to quantify GFP fluorescence may be automated [Lee et al. 2006]. Images may be transformed and aligned to fit a template root atlas annotated by tissue type. The success of image alignment and GFP detection was tested using images for twenty-three transcriptional reporters. Correlation to the device of FIGS. 1-6A, 6B, 6C and 7-8 was used to determine expression for thirteen cell sorted tissues, and illustrates that quantitative fluorescent reporter data may be obtained from confocal images of plants with detectable levels of GFP. FIG. 12 illustrates that an Atlas image alignment produces relative expression data that is supported by devices according to embodiments of the present invention. See Mace D L, Lee J Y, Twigg R W, Colinas J, Benfey P N, Ohler U. Quantification of transcription factor expression from *Arabidopsis* images. Bioinformatics. 2006, 22 (14):e323-31.

Devices according to embodiments of the present invention have been tested for the ability to capture the transcriptional promoter response to manipulation of the liquid growth environment. Time-lapse images were captured for a promoter reporter of the SCARECROW (SCR) gene as it is activated following induction with Dexamethasone to rescue SHORTROOT activity. A representative selection of five time points is shown in addition to GFP quantitation for 13 of the 26 time points within the 12 hour experiment (FIGS. 13A-13B). In addition, time-lapse imaging using artificial gene induction may be performed. Calibration of quantitation methods between tissues and in relation to empirical determination of transcriptional output may be a step towards high-throughput application of promoter reporters as quantitative proxy for expression according to embodiments of the present invention.

*Arabidopsis* Genetic Background for Automated Imaging

A screen for subcellular localization of GFP identified four protein sequences that target GFP to the cell surface [Cutler et al. 2000]. Line 37-26 has been tested and shows promise as an alternative to staining by FM4-64 or propidium iodide. The known subcellular target sequence may be fused to an appropriate fluorescent protein whose emission can be resolved from GFP, such as the mCherry RFP construct developed by [Shaner et al, 2004]. Multiple promoters may be tested to achieve ubiquitous expression in the root. The proposed genetic background for imaging may additionally express a fluorescent reporter marking the quiescent center (QC). A transcriptional GFP reporter has been developed, line Q12, which strongly marks these 4-7 cells in the root tip. This promoter, or elements derived from it, may be engineered to express a fluorescent protein that can be spectrally resolved from both GFP and the mCherry RFP, such as an orange variant [Shaner et al, 2005].

Quantitative Confocal Root Image Analysis of GFP Fluorescence as a Reporter for the Activity of Gene Promoter Regions Fluorescent reporters can provide a read-out for the activity of promoters. To more accurately correlate the fluorescence analysis of a confocal root image to the actual promoter activity, measurements and models of a system may be performed. It may be possible to correct for predictable anomalies and account for noise inherent in the imaging and transgenic reporter system. Independent measurement of transcriptional products can be quantitatively correlated to transcriptional reporter activity.

Model Attenuation of Fluorescence Image Due to Depth

Depth may be a factor in larger, multicellular systems. Light scatter and absorbance may occur during laser excitation and fluorescence emission as a function of depth and the optical transparency properties of the tissues. A data set generated from a collection of plants, e.g., about fifteen plants, each expressing a tissue specific GFP, representing the entire anatomy of the root, can be used to indirectly test the root's optical properties.

Figure 15A:
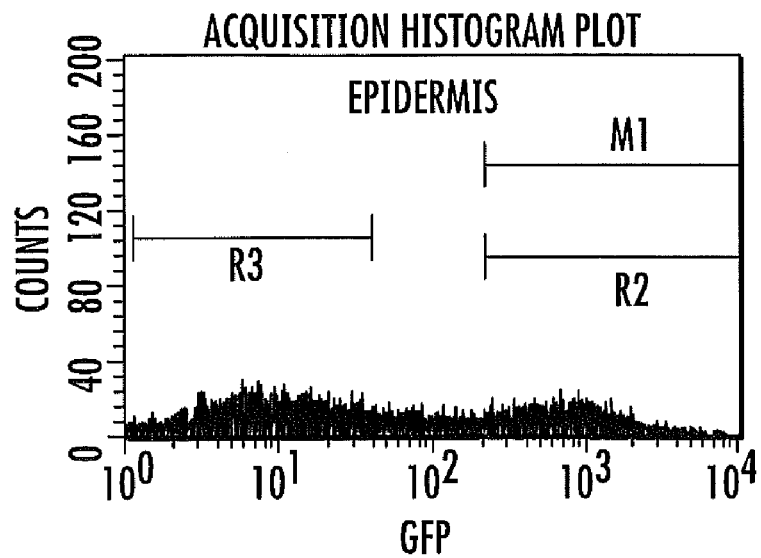
FIGS. 15A-15B are graphs of flow cytometry data in the epidermis and quiescent center of a plant that may be used to calibrate tissue specific image quantitation according to embodiments of the present invention.
Figure 15B:
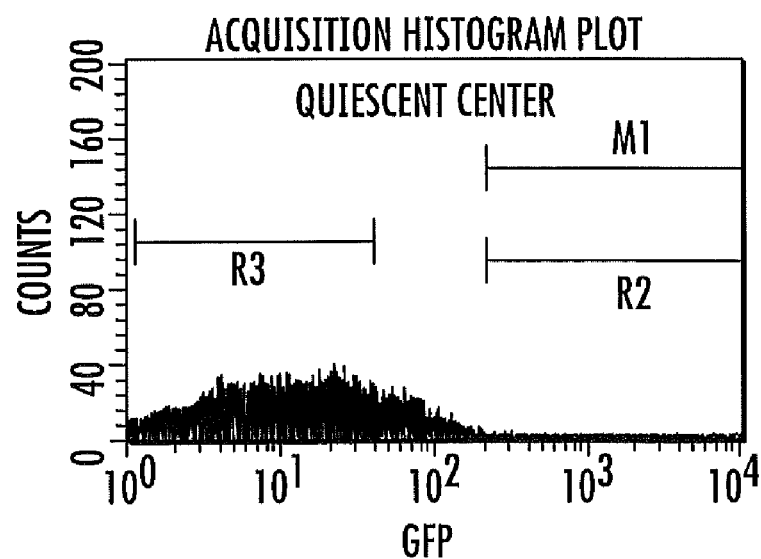

FIGS. 15A-15B illustrates the flow cytometry data that can be used to calibrate tissue specific image quantitation. For each plant line, the distribution of fluorescence intensity for the collection of individual cells can be quantified and applied to a fluorescence activated cell sorter. The flow cytometry data may be used to create a mathematical depth correction function for the radial axis of the root. The success of the depth correction may be assessed by the level of statistically significant improvement to the correlation between image analysis and root expression map data performed by Mace D L, Lee J Y, Twigg R W, Colinas J, Benfey P N, Ohler U. Quantification of transcription factor expression from *Arabidopsis* images. Bioinformatics 2006, 22(14):e323-31. Other methods may be used to test or improve the depth correction function. For example, one would involve micro-injection of a fluorescent standard to a cell in each tissue layer. Another method would quantify GFP fluorescence using a low volume NanoDrop fluorometer with the lysate of a single root following confocal imaging of that same root. A third method involves imaging a set of promoter reporters that are expressed ubiquitously and at comparable concentrations between tissues.

Scanning Images in the Z-Axis

Choosing the number of images captured in the z-axis may be performed to reduce the number of images captured. In particular embodiments, quantification of GFP in a cell is carried out by capturing array images of the cellular compartment containing the GFP. In some embodiments, for each transcriptional reporter, GFP is targeted to the endoplasmic reticulum (ER) to reduce or prevent intercellular GFP movement. ER targeting also creates a predictable accumulation pattern that is comparable between the tissue types of the root meristem. However, images that capture anticlinal cell walls may lack GFP fluorescence. A small set of images in the Z axis may provide more robust image data by representing whole cells. A second potential benefit of using multiple images in the Z-axis is for the ability to reconstruct a root's three-dimensional anatomy. Certain analysis methods may use images that are parallel with the longitudinal axis of the root. To the extent that devices according to embodiments of the present invention allow roots to grow toward or away from the imaging plane, the ability to computationally section a new image plane from the reconstruction of such a root may be tested. A training set of images can be generated from a collection of plants with a range of ideally oriented and less cooperative roots. This training collection may provide a range of Z-stack sets for a range of z-section thicknesses, and for a range of interval distances between sections. These parameters may be optimized as described herein by measuring the improved correlation to a training set of tissue specific expression profiles. An alternative approach is to develop a 3D image data analysis pipeline. For each of the 2D algorithms used in data analysis, there exists an equivalent for three dimensions. However, the conversion to 3D may be difficult, partly because confocal images may not be obtained much beyond the median plane of the root. Multi-photon microscopy may provide additional imaging depth, or the symmetry of the root to "mirror" the top half of the root may be used to artificially recreate the cylindrical root geometry.

Assess Transgenic Reporters to Reflect Endogenous Promoter Activity

GFP may be engineered with polypeptide tags targeting ubiquitin mediated target destruction [Downes and Vierstra. 2005, Menendez-Benito et al. 2005]. An alternative solution would use the DsRed-E5 reporter which has predictable changing emission spectra from green to red during its 18 hour maturation, making it well-suited to ratiometric emission analysis to determine both up and down-regulation of expression [Mirabella et al. 2004]. In addition to using standardized settings for excitation, prior to each data acquisition routine, further calibration can be attained using a set of fluorescent reference standards, for example, from Invitrogen, matched with the emission wavelength of each fluorescent protein variant used.

Correlate Fluorescence to Numbers of GFP mRNA

The GFP mRNA may be quantified by quantitative RT-PCR or any other suitable technique. In one experiment, RNA is collected from whole roots for a collection of, e.g., 15 GFP plant lines that are representative of the entire root. The correlation of GFP mRNA abundance to the quantitative image analysis described herein may be assessed. Another experiment uses Q-RT-PCR of GFP for a 24 hour time course at 1 hour intervals following induction of the promoter SCARECROW:GFP reporter plant. Comparison of this data to multiple 24 hour image acquisition series for these plants may provide information to model both the speed of the chemical induction and the lag time of GFP maturation. A supporting experiment may involve microinjection of pre-determined numbers of GFP mRNA. Data from this approach can be used to calibrate for attenuation due to depth, measure GFP maturation rate, and correlate fluorescence to mRNA molecule number.

Examine Transcriptional Response to External Stimuli

Existing methods to measure gene expression dynamics may be hindered either by excessive cost, limited spatial or temporal information, or by the number of genes that can be measured. Controlled manipulation of the liquid growth media for a growing root may elicit a genetic and developmental response that can be measured by image analysis. A growing collection of transcriptional reporters exists, which can be used for plant imaging according to embodiments of the present invention.

Capture Expression Activation in a Gene Network

The SHORTROOT (SHR) and SCARECROW (SCR) proteins are typically considered necessary for the proper division and differentiation of the cortex/endodermis initial. SHR activates SCR transcription in the cortex/endodermis initial [Cui et al, 2007]. In the shr-2 mutant background, SCR expression is nearly absent and this division fails to occur [Helariutta et al, 2000]. A plant that rescues SHR expression may be generated using a steroid induction system in the shr-2 background [Levesque et al, 2006]. Heat shock protein 90(Hsp90) sequesters a SHR:glucocorticoid receptor fusion protein in the cytoplasm. Upon addition of the synthetic steroid, Dexamethasone, Hsp90 releases SHR permitting it to enter the nucleus and activate SCR transcription. This same plant line also has a transcriptional reporter of SCARECROW, pSCR:GFP. This induction system may be used with plant arrays according to embodiments of the invention for time lapse imaging to study gene activation and development simultaneously. Protein behavior may also be studied according to embodiments of the invention, including a split-YFP system to probe the spatial and temporal interaction of the SCR and SHR proteins. Crosses between GFP reporter plants and mutants of genes known or implicated in this pathway may resolve dynamic phenotypes for classical epistasis experiments.

Transcriptional Reporters of Gene Expression to Determine Dynamic Response to Environmental Stimuli A collection of promoter reporters can be used, including a collection of promoter reporters that has been developed for a third of all transcription factors genes that are expressed significantly higher in one tissue compared to four other tissues in the root [Lee et al. 2006]. This collection of 61 reporters can be used to evaluate the environmental expression response according to embodiments of the present invention. The root tissue expression map can be compared to the AtGenExpress Gene Atlas to implicate genes that may exhibit tissue specific activity in response to abiotic stress conditions. An overlap comparison may implicate genes and may show tissue specific response to the environment, and allowing a prioritization of the creation of new promoter reporters. The arrangement of reporter plants can be based on the standard principles of microarray design [Draghici 2003]. These include multiple replicates for each feature, random assignment of position, internal fluorescent standards, and promoter-less GFP as a negative control. For quality control, available reporter plants can be used to detect plant stress through activation of characterized stress response genes such as catalase, alcohol dehydrogenase, and Hsp [Manak et al. 2005]. The dynamic developmental and transcriptional response of roots switched to limited media for primary and secondary nutrients can be systematically characterized, for example using at least 6 essential micronutrients. Abiotic stressors can be tested including salt, osmolarity, drought, oxidation, darkness, heat, and cold. Controlled air exchange may allow a survey of the root's response to gaseous pollutants and to an increased carbon dioxide environment. Results can be compared between environmental conditions and temporal and spatial patterns of gene induction can be compared. The timing of gene activation may be compared between genes using clustering methods to identity genes that may be activated in concert. The initiation time of gene activation may be analyzed as an indicator of how transcription factors may be ordered in a transcription network. The low cost of each experiment will allow the production of a map of the concentrations of nutrient and/or toxic chemical concentrations for each environmental condition. The data may be used to inform the critical time points and chemical concentration to be used for subsequent genomic expression analysis.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

REFERENCES

Andrews P D, Harper I S, Swedlow J R. To 5D and beyond: quantitative fluorescence microscopy in the postgenomic era. Traffic 2002, 3:29-36.

Beemster G T, Baskin T I. Analysis of cell division and elongation underlying the developmental acceleration of root growth in *Arabidopsis thaliana*. Plant Physiology 1998, 116:1515-26.

Birnbaum K, Jung J W, Wang J Y, Lambert G M, Hirst J A, Galbraith D W, Benfey P N. Cell type-specific expression profiling in plants via cell sorting of protoplasts from fluorescent reporter lines. Nature Methods 2005, 2:615-9.

Birnbaum K, Shasha D E, Wang J Y, Jung J W, Lambert G M, Galbraith D W, Benfey P N. A gene expression map of the *Arabidopsis* root. Science 2003, 302:1956-60. Brady S M, Orlando D A, Lee J-Y, Wang J Y, Koch J, Dinneny J R, Mace D, Ohler U, and Benfey P N (2007) A High-Resolution Root Spatiotemporal Map Reveals Dominant Expression Patterns. *Science* 318: 801-806

Brown P O, Botstein D. Exploring the new world of the genome with DNA microarrays. Nature Genetics 1999, 21 (1 Suppl):33-7.

Chalfie M, Tu Y, Euskirchen G, Ward W W, Prasher D C. Green fluorescent protein as a marker for gene expression. Science. 1994, 263:802-5.

de Reuille P B, Bohn-Courseau I, Ljung K, Morin H, Carraro N, Godin C, Traas J. Computer simulations reveal properties of the cell-cell signaling network at the shoot apex in *Arabidopsis*. PNAS 2006, 103:1627-32.

Cutler S R, Ehrhardt D W, Griffitts J S, Somerville C R. Random GFP::cDNA fusions enable visualization of subcellular structures in cells of *Arabidopsis* at a high frequency. PNAS 2000, 97:3718-23.

Dixit R, Cyr R, Gilroy S. Using intrinsically fluorescent proteins for plant cell imaging. Plant Journal 2006, 45:599-615.

Dmochowski I J, Dmochowski J E, Oliveri P, Davidson E H, Fraser S E. Quantitative imaging of cis-regulatory reporters in living embryos. PNAS 2002, 99:12895-900. Downes B, Vierstra R D. Post-translational regulation in plants employing a diverse set of polypeptide tags. Biochemical Society Transactions 2005, 33:393-9.

Sorin Draghici. Data Analysis Tools for DNA Microarrays. 2003. Chapman & Hall/CRC. Boca Raton, Fla.

Echeverri C J, Perrimon N. High-throughput RNAi screening in cultured cells: a user's guide. Nature Reviews Genetics 2006, 7:373-84.

Friedman N, Vardi S, Ronen M, Alon U, Stavans J. Precise temporal modulation in the response of the SOS DNA repair network in individual bacteria. PLoS Biology 2005, 3:e238.

Giepmans B N, Adams S R, Ellisman M H, Tsien R Y. The fluorescent toolbox for assessing protein location and function. Science 2006, 312:217-24.

Grabov A, Ashley M K, Rigas S, Hatzopoulos P, Dolan L, Vicente-Agullo F. Morphometric analysis of root shape. New Phytologist 2005, 165:641-51.

Harbison C T, Gordon D B, Lee T I, Rinaldi N J, Macisaac K D, Danford T W, Hannett N M, Tagne J B, Reynolds D B, Yoo J, Jennings E G, Zeitlinger J, Pokholok D K, Kellis M, Rolfe P A, Takusagawa K T, Lander E S, Gifford D K, Fraenkel E, Young R A. Transcriptional regulatory code of a eukaryotic genome. Nature 2004, 431(7004):99-104.

Helariutta Y, Fukaki H, Wysocka-Diller J, Nakajima K, Jung J, Sena G, Hauser M T, Benfey P N. The SHORT-ROOT gene controls radial patterning of the *Arabidopsis* root through radial signaling. Cell 2000, 101:555-67.

Ideker T, Thorsson V, Ranish J A, Christmas R, Buhler J, Eng J K, Bumgarner R, Goodlett D R, Aebersold R, Hood L. Integrated genomic and proteomic analyses of a systematically perturbed metabolic network. Science 2001, 292: 929-34.

Jonsson H, Heisler M, Reddy G V, Agrawal V, Gor V, Shapiro B E, Mjolsness E, Meyerowitz E M. Modeling the organization of the WUSCHEL expression domain in the shoot apical meristem. Bioinformatics 2005, 21:i232-i240.

Kakoki M, Tsai Y S, Kim H S, Hatada S, Ciavatta D J, Takahashi N, Arnold L W, Maeda N, Smithies O. Altering the expression in mice of genes by modifying their 3' regions. Developmental Cell 2004, 6:597-606.

Kalir S, McClure J, Pabbaraju K, Southward C, Ronen M, Leibler S, Surette M G, Alon U. Ordering genes in a flagella pathway by analysis of expression kinetics from living bacteria. Science 2001, 292:2080-3.

Kiger A A, Baum B, Jones S, Jones M R, Coulson A, Echeverri C, Perrimon N. A functional genomic analysis of cell morphology using RNA interference. Journal of Biology 2003, 2:27.

Lee J Y, Colinas J, Wang J Y, Mace D, Ohler U, Benfey P N. Transcriptional and posttranscriptional regulation of transcription factor expression in *Arabidopsis* roots. PNAS 2006, 103:6055-60.

Levesque M P, Vernoux T, Busch W, Cui H, Wang J Y, Blilou I, Hassan H, Nakajima K, Matsumoto N, Lohmann J U, Scheres B, and Benfey P N (2006) Whole-genome Analysis of the SHORT-ROOT Developmental Pathway in *Arabidopsis*. PloS Biology 4:e143

Lucchetta E M, Lee J H, Fu L A, Patel N H, Ismagilov R F. Dynamics of Drosophila embryonic patterning network perturbed in space and time using microfluidics. Nature 2005, 434:1134-8.

Mace D L, Lee J Y, Twigg R W, Colinas J, Benfey P N, Ohler U. Quantification of transcription factor expression from *Arabidopsis* images. Bioinformatics 2006, 22(14):e323-31.

Manak M S, Paul A L, Sehnke P C, Ferl R J. Remote sensing of gene expression in Planta: transgenic plants as monitors of exogenous stress perception in extraterrestrial environments. Life Support Biosphere Science 2002, 8:83-91.

McDonald J C, Duffy D C, Anderson J R, Chiu D T, Wu H, Schueller O J, Whitesides G M. Fabrication of microfluidic systems in poly(dimethylsiloxane). Electrophoresis 2000, 21(1):27-40.

Menendez-Benito V, Heessen S, Dantuma N P. Monitoring of ubiquitin-dependent proteolysis with green fluorescent protein substrates. Methods Enzymology 2005, 399:490-511.

Mirabella R, Franken C, van der Krogt G N, Bisseling T, Geurts R. Use of the fluorescent timer DsRED-E5 as reporter to monitor dynamics of gene activity in plants. Plant Physiololgy 2004, 135:1879-87.

Rosenfeld N, Young J W, Alon U, Swain P S, Elowitz M B. Gene regulation at the single-cell level. Science 2005, 307: 1962-5.

Rual J F, Venkatesan K, Hao T, Hirozane-Kishikawa T, Dricot A, Li N, Berriz G F, Gibbons F D, Dreze M, Ayivi-Guedehoussou N, Klitgord N, Simon C, Boxem M, Milstein S, Rosenberg J, Goldberg D S, Zhang L V, Wong S L, Franklin G, Li S, Albala J S, Lim J, Fraughton C, Llamosas E, Cevik S, Bex C, Lamesch P, Sikorski R S, Vandenhaute J, Zoghbi H Y, Smolyar A, Bosak S, Sequerra R, Doucette-Stamm L, Cusick M E, Hill D E, Roth F P, Vidal M. Towards a proteome-scale map of the human protein-protein interaction network. Nature 2005, 437:1173-8.

Schmid M, Davison T S, Henz S R, Pape U J, Demar M, Vingron M, Scholkopf B, Weigel D, Lohmann J U. A gene expression map of *Arabidopsis thaliana* development. Nature Genetics 2005, 37:501-6.

Shaner N C, Campbell R E, Steinbach P A, Giepmans B N, Palmer A E, Tsien R Y. Improved monomeric red, orange and yellow fluorescent proteins derived from Discosoma sp. red fluorescent protein. Nature Biotechnology 2004, 22:1567-72.

Shaner N C, Steinbach P A, Tsien R Y. A guide to choosing fluorescent proteins. Nature Methods 2005, 2:905-9.

Somerville C, Dangl. Genomics. Plant biology in 2010. Science 2000, 290:2077-8.

Swarup R, Kramer E M, Perry P, Knox K, Leyser H M, Haseloff J, Beemster G T, Bhalerao R, Bennett M J. Root gravitropism requires lateral root cap and epidermal cells for transport and response to a mobile auxin signal. Nature Cell Biology 2005, 7:1057-65.

Wu J Q, Pollard T D. Counting cytokinesis proteins globally and locally in fission yeast. Science 2005, 310:310-4.

Yamada K, Lim J, Dale J M, Chen H, Shinn P, Palm C J, Southwick A M, Wu H C, Kim C, Nguyen M, Pham P, Cheuk R, Karlin-Newmann G, Liu S X, Lam B, Sakano H, Wu T, Yu G, Miranda M, Quach H L, Tripp M, Chang C H, Lee J M, Toriumi M, Chan M M, Tang C C, Onodera C S, Deng J M, Akiyama K, Ansari Y, Arakawa T, Banh J, Banno F, Bowser L, Brooks S, Carninci P, Chao Q, Choy N, Enju A, Goldsmith A D, Gurjal M, Hansen N F, Hayashizaki Y, Johnson-Hopson C, Hsuan V W, Iida K, Karnes M, Khan S, Koesema E, Ishida J, Jiang P X, Jones T, Kawai J, Kamiya A, Meyers C, Nakajima M, Narusaka M, Seki M, Sakurai T, Satou M, Tamse R, Vaysberg M, Wallender E K, Wong C, Yamamura Y, Yuan S, Shinozaki K, Davis R W, Theologis A, Ecker J R. Empirical analysis of transcriptional activity in the *Arabidopsis* genome. Science 2003, 302: 842-6.

That which is claimed is:

1. A method of imaging a root and/or aerial portion of a plurality of plants, the method comprising:
  growing a plurality of plants in a plant growth array device, the device comprising:
    an aerial growth chamber configured to contain aerial shoot portions of the plurality of plants;
    a root growth chamber configured to contain root portions of the plurality of plants; and
    a dividing member between the aerial growth chamber and the root chamber and having a plurality of apertures for receiving the plurality of plants therein; and
  imaging the root portions and/or aerial shoot portions of the plurality of plants in the plant growth array device,
  wherein the plant growth array device includes a translucent and/or transparent imaging panel on at least one of the aerial growth chamber and the root chamber and imaging the root portions and/or aerial shoot portions of the plurality of plants includes imaging with a microscope, and imaging the root portions and/or aerial shoot portions comprises imaging the root portions and/or aerial shoot portions via the translucent and/or transparent imaging panel.

2. The method of claim 1, wherein the transparent and/or translucent side of the growth chamber comprises a microscope slide and/or coverslip.

3. The method of claim 2, wherein the microscope slide and/or coverslip is removable.

4. The method of claim 1, further comprising maintaining a gaseous growth environment in the aerial growth chamber and a liquid growth environment in the root growth chamber.

5. The method of claim 4, further comprising providing a gel growth media in the plurality of apertures.

6. The method of claim 4, wherein the liquid growth media comprises a selected nutrient solution.

7. The method of claim 1, further comprising supplying a fluid to at least one of the aerial growth chamber and/or the root growth chamber via at least one conduit.

8. The method of claim 7, further comprising controlling a composition and or amount of the fluid supplied to at least one of the aerial growth chamber and/or the root growth chamber.

9. The method of claim 1, wherein the plurality of apertures are semi-gibbous.

10. The method of claim 9, wherein the plurality of apertures extend at an angle between about 20 and 75 degrees with respect to the dividing member.

11. The method of claim 1, wherein imaging the root portions and/or aerial shoot portions of the plurality of plants in the plant growth array device comprises imaging the root portions and/or aerial shoot portions with an imaging device including a microscope.

12. The method of claim 1, further comprising monitoring at least one environmental condition using one or more sensors configured to measure the at least one environmental condition.

13. The method of claim 12, further comprising controlling an environmental condition using an environmental control system configured to control an environmental condition in the aerial growth chamber and/or the root growth chamber.

14. The method of claim 1, wherein imaging the root portions and/or aerial shoot portions of the plurality of plants in the plant growth array device comprises fluorescent imaging of the root portion of the plurality of plants when the plurality of plants are in the plant growth array device using a confocal laser imaging microscope.

15. A method of imaging a root and/or aerial portion of a plurality of plants, the method comprising:
growing a plurality of plants in a plant growth array device, the device comprising:
an aerial growth chamber configured to contain aerial shoot portions of the plurality of plants;
a root growth chamber configured to contain root portions of the plurality of plants; and
a dividing member between the aerial growth chamber and the root chamber and having a plurality of apertures for receiving the plurality of plants therein; and
imaging the root portions and/or aerial shoot portions of the plurality of plants in the plant growth array device;
wherein the plurality of apertures are configured so that the root portions grow substantially in a common orientation, and the root growth chamber includes a transparent and/or translucent side thereof that covers the apertures and is configured so that the root portions grow substantially in the common orientation along the transparent and/or translucent side of the growth chamber.

16. A method of imaging a root and/or aerial portion of a plurality of plants, the method comprising:
growing a plurality of plants in a plant growth array device, the device comprising:
an aerial growth chamber configured to contain aerial shoot portions of the plurality of plants;
a root growth chamber configured to contain root portions of the plurality of plants; and
a dividing member between the aerial growth chamber and the root chamber and having a plurality of apertures for receiving the plurality of plants therein; and
imaging the root portions and/or aerial shoot portions of the plurality of plants in the plant growth array device;
wherein the plant growth array device includes a translucent and/or transparent imaging panel on at least one of the aerial growth chamber and the root chamber and imaging the root portions and/or aerial shoot portions of the plurality of plants includes imaging with a microscope, and imaging the root portions and/or aerial shoot portions comprises imaging the root portions and/or aerial shoot portions via the translucent and/or transparent imaging panel;
wherein imaging the root portions and/or aerial shoot portions of the plurality of plants in the plant growth array device comprises imaging the root portions and/or aerial shoot portions that grow substantially in a common orientation along the transparent and/or translucent side of the growth chamber that covers the apertures.

* * * * *